US012631905B2

(12) United States Patent
Webber et al.

(10) Patent No.: US 12,631,905 B2
(45) Date of Patent: May 19, 2026

(54) OPHTHALMIC LENSES AND METHODS RELATING THERETO

(71) Applicant: CooperVision International Limited, Fareham (GB)

(72) Inventors: Martin Webber, Southampton (GB); Paul Chamberlain, Livermore, CA (US); Arthur Bradley, Bloomington, IN (US); Baskar Arumugam, Dublin, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 120 days.

(21) Appl. No.: 18/921,029

(22) Filed: Oct. 21, 2024

(65) Prior Publication Data

US 2025/0138340 A1      May 1, 2025

Related U.S. Application Data

(60) Provisional application No. 63/545,987, filed on Oct. 27, 2023.

(51) Int. Cl.
*G02C 7/04* (2006.01)
*B29D 11/00* (2006.01)

(52) U.S. Cl.
CPC ........ *G02C 7/044* (2013.01); *B29D 11/00038* (2013.01); *G02C 2202/22* (2013.01); *G02C 2202/24* (2013.01)

(58) Field of Classification Search
CPC ............................. G02C 2202/24; G02C 7/044
(Continued)

(56) References Cited

U.S. PATENT DOCUMENTS

| | | | | |
|---|---|---|---|---|
| 4,580,882 A | * | 4/1986 | Nuchman ............ | G02B 5/1895 |
| | | | | 351/159.41 |
| 5,225,858 A | * | 7/1993 | Portney ................. | A61F 2/1618 |
| | | | | 623/6.27 |

(Continued)

FOREIGN PATENT DOCUMENTS

| | | | | |
|---|---|---|---|---|
| EP | 3598211 A1 | 1/2020 | | |
| FR | 3104746 A1 | * 6/2021 | ............. | G02C 7/027 |

(Continued)

OTHER PUBLICATIONS

Office Action issued in corresponding Taiwan Patent Application No. 113140712 issued Apr. 10, 2026 (14 pages).

(Continued)

*Primary Examiner* — Zachary W Wilkes
(74) *Attorney, Agent, or Firm* — Kilyk & Bowersox, P.L.L.C.

(57) ABSTRACT

An ophthalmic lens (1) and methods (1000) of manufacturing an ophthalmic lens are described. The lens (1) includes an optic zone. The optic zone comprises a central region (5) having a curvature that is centred on an optical axis (19), the central region (5) providing a distance corrective radial curvature power. The central region (5) has a radial sagittal power profile that increases with increasing radial distance from the optical axis (19). The gradient of the radial sagittal power profile across the central region (5) increases with increasing radial distance from the optical axis (19), following a first curve. A first annular region (3) circumscribes the central region (5). The first annular region (3) provides a radial curvature add power.

13 Claims, 13 Drawing Sheets

(58) Field of Classification Search

USPC ........................................ 351/159.12, 159.05

See application file for complete search history.

(56) References Cited

U.S. PATENT DOCUMENTS

| | | | | |
|---|---|---|---|---|
| 6,045,578 | A | 4/2000 | Collins et al. | |
| 6,176,579 | B1 * | 1/2001 | Mandell ................. | G02C 7/042 351/159.22 |
| 6,260,966 | B1 * | 7/2001 | Sawano ................. | G02C 7/042 351/159.43 |
| 6,286,956 | B1 * | 9/2001 | Oyama .................. | G02C 7/043 351/159.41 |
| 6,874,887 | B2 * | 4/2005 | Tyson ................... | G02C 7/042 351/159.41 |
| 6,957,891 | B2 * | 10/2005 | Fiala ...................... | G02C 7/028 351/159.02 |
| 8,684,520 | B2 * | 4/2014 | Lindacher ............. | G02C 7/028 351/159.52 |
| 8,690,319 | B2 * | 4/2014 | Menezes ................ | G02C 7/044 351/159.16 |
| 8,770,745 | B2 * | 7/2014 | Lindacher ............. | G02C 7/028 351/159.79 |
| 8,998,408 | B2 | 4/2015 | Wei et al. | |
| 9,541,773 | B2 * | 1/2017 | Bakaraju ............... | G02C 7/061 |
| 9,625,739 | B2 * | 4/2017 | Brennan ............... | A61F 2/1451 |
| 10,028,825 | B2 * | 7/2018 | Canovas Vidal ..... | A61F 2/1654 |
| 10,698,232 | B2 * | 6/2020 | Lin ........................ | G02C 7/16 |
| 10,901,237 | B2 * | 1/2021 | Brennan ............... | G02C 7/044 |
| 11,409,132 | B2 * | 8/2022 | Shimojyou ........... | G02C 7/041 |
| 11,452,595 | B2 * | 9/2022 | Bogaert ................ | A61F 2/1613 |
| 11,493,782 | B2 | 11/2022 | Simard et al. | |
| 11,529,228 | B2 * | 12/2022 | Liang ...................... | A61F 2/147 |
| 11,567,346 | B2 | 1/2023 | Griffin et al. | |
| 11,754,859 | B2 * | 9/2023 | Brennan .................. | G02C 7/02 623/6.27 |
| 11,789,292 | B2 * | 10/2023 | Brennan ................ | G02C 7/022 623/6.27 |
| 12,105,361 | B2 * | 10/2024 | Chamberlain ........... | G02C 7/04 |
| 2006/0215109 | A1 | 9/2006 | Lindacher et al. | |
| 2008/0084534 | A1 * | 4/2008 | Lindacher ............. | A61F 2/1602 351/159.08 |
| 2010/0057202 | A1 * | 3/2010 | Bogaert ................ | A61F 2/1613 623/6.27 |
| 2011/0029073 | A1 * | 2/2011 | Liang ..................... | G02C 7/044 623/5.11 |
| 2011/0037944 | A1 | 2/2011 | Varnas | |
| 2012/0320333 | A1 * | 12/2012 | Holden .................. | G02C 7/063 351/159.73 |
| 2016/0054587 | A1 * | 2/2016 | Brennan ................ | G02C 7/041 623/6.11 |
| 2017/0227788 | A1 | 8/2017 | Griffin et al. | |
| 2017/0245987 | A1 * | 8/2017 | Canovas Vidal ..... | A61F 2/1654 |
| 2017/0276961 | A1 * | 9/2017 | Wooley .................. | G02C 7/044 |
| 2018/0373059 | A1 * | 12/2018 | Lin ........................ | G02C 7/061 |
| 2019/0155057 | A1 | 5/2019 | Varnas | |
| 2019/0227342 | A1 * | 7/2019 | Brennan ................ | G02C 7/044 |
| 2022/0287826 | A1 * | 9/2022 | Tiwari ................... | G02C 7/028 |
| 2023/0194896 | A1 | 6/2023 | Webber et al. | |
| 2023/0229020 | A1 * | 7/2023 | Bradley .................. | G02C 7/04 351/159.02 |
| 2023/0305318 | A1 * | 9/2023 | Esfandiarijahromi ....................... | G02C 7/042 |
| 2023/0408845 | A1 * | 12/2023 | Bradley ................. | G02C 7/041 |
| 2025/0028189 | A1 * | 1/2025 | Kotelsky ................. | G02C 7/04 |
| 2026/0033942 | A1 * | 2/2026 | Esfandiarijahromi ....................... | A61F 2/1602 |

FOREIGN PATENT DOCUMENTS

| | | |
|---|---|---|
| GB | 2624763 A | 5/2024 |
| WO | 2024069185 A1 | 4/2024 |

OTHER PUBLICATIONS

Partial International Search Report issued in corresponding International Patent Application No. PCT/GB2024/052690 mailed Jan. 24, 2025 (14 pages).

Combined Search and Examination Report issued in corresponding United Kingdom Patent Application No. GB2415455.1 dated Feb. 26, 2025 (9 pages).

International Search Report and Written Opinion issued in corresponding International Patent Application No. PCT/GB2024/052690 mailed Mar. 28, 2025 (24 pages).

PCT Demand filed Aug. 27, 2025 in corresponding International Patent Application No. PCT/GB2024/052690 (20 pages).

Second Written Opinion issued in corresponding International Patent Application No. PCT/GB2024/052690 dated Sep. 29, 2025 (7 pages).

Response to Second Written Opinion filed Oct. 15, 2025 in corresponding International Patent Application No. PCT/GB2024/052690 (13 pages).

International Preliminary Report on Patentability issued in corresponding International Patent Application No. PCT/GB2024/052690 dated Jan. 20, 2026 (16 pages).

* cited by examiner

OPHTHALMIC LENSES AND METHODS RELATING THERETO

This application claims the benefit under 35 U.S.C. § 119(e) of prior U.S. Provisional Patent Application No. 63/545,987, filed Oct. 27, 2023, which is incorporated in its entirety by reference herein.

TECHNICAL FIELD

The present invention relates to ophthalmic lenses. The present invention relates especially, but not exclusively, to ophthalmic lenses for slowing the progression of myopia. The present invention also relates to methods of manufacturing such lenses.

BACKGROUND

Many people, including children and adults require ophthalmic lenses to correct for myopia (short-sightedness).

Uncorrected myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach to correct for myopia is to provide lenses having both one or more regions that provide full correction of distance vision and one or more regions that under-correct, or deliberately induce, myopic defocus. It has been suggested that this approach can prevent or slow down the development or progression of myopia in children or young people, whilst providing good distance vision.

In the case of lenses having regions that provide defocus, the regions that provide full-correction of distance vision may be referred to as distance corrective regions and the regions that provide under-correction or deliberately induce myopic defocus are usually referred to as myopic defocus regions, treatment regions, or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens).

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights.

Further lenses have been developed which can be used in the treatment of myopia, and which are designed to eliminate the halo that is observed around focused distance images in the MISIGHT (CooperVision, Inc.) lenses and other similar lenses described above. In these lenses, the annular region is configured such that no single, on-axis image is formed in front of the retina, thereby preventing such an image from being used to avoid the need for the eye to accommodate near targets. Rather, distant point light sources are imaged by the annular region to a ring-shaped focal line at a near add power focal surface, leading to a small spot size of light, without a surrounding 'halo' effect, on the retina at a distance focal surface.

The present disclosure seeks to provide an improved lens for introducing additional myopic defocus, and benefits from the improved image quality enabled by off-axis imaging techniques as described above.

SUMMARY

According to a first aspect, the present disclosure provides an ophthalmic lens. The lens includes an optic zone. The optic zone comprises a central region having a curvature that is centred on an optical axis. The central region provides a distance corrective radial curvature power, and has a radial sagittal power profile that increases with increasing radial distance from the optical axis. The gradient of the radial sagittal power profile across the central region increases with increasing radial distance from the optical axis, following a first curve. The optic zone comprises a first annular region circumscribing the central region. The first annular region provides a radial curvature add power.

According to a second aspect, the present disclosure provides a method of manufacturing an ophthalmic lens. The method comprises providing a spherical aberration power profile, the spherical aberration power profile being the variation in radial sagittal power for an eye as a function of radial distance from the optical axis of the eye. The method comprises providing a target radial sagittal power profile for a lens wearer, the target radial sagittal power profile being the target variation in radial sagittal power as a function of radial distance from an optical axis of the eye of the lens wearer, wherein the target radial sagittal power profile includes a central region having a base radial curvature power, and a first annular region that provides a radial curvature add power. The method comprises subtracting the spherical aberration power profile from the target radial sagittal power profile, thereby generating a corrected radial sagittal power profile. The method comprises manufacturing an ophthalmic lens having the corrected radial curvature power profile.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE FIGURES

Embodiments of the present invention will now be described by way of example only with reference to the accompanying schematic drawings of which.

DETAILED DESCRIPTION

Figure 1A:
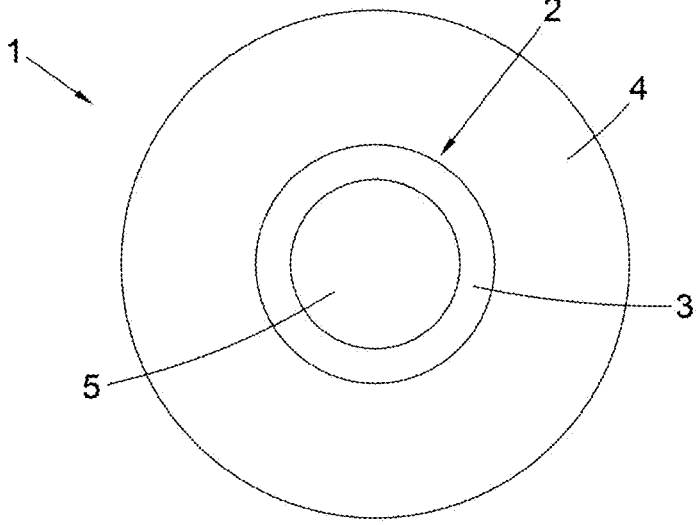
FIG. 1A is a schematic top view of a first known ophthalmic lens (a type A lens) having an annular treatment zone that provides a myopically defocused image to reduce the progression of myopia.

According to a first aspect, the present disclosure provides an ophthalmic lens. The lens includes an optic zone. The optic zone comprises a central region that is centred on an optical axis. The central region provides a distance corrective radial curvature power, and has a radial sagittal power profile that increases with increasing radial distance from the optical axis. The gradient of the radial sagittal power profile across the central region increases with increasing radial distance from the optical axis, following a first curve. The optic zone comprises a first annular region circumscribing the central region. The first annular region provides a radial curvature add power.

The ophthalmic lens may be a contact lens or a spectacle lens. As used herein, the term contact lens refers to an ophthalmic lens that can be placed onto the anterior surface of the eye. It will be appreciated that such a contact lens will provide clinically acceptable on-eye movement and not bind to the eye or eyes of a person. The ophthalmic lens may be in the form of a corneal lens (e.g., a lens that rests on the cornea of the eye). The ophthalmic lens may be a soft contact lens, such as a hydrogel contact lens or a silicone hydrogel contact lens. The ophthalmic lens may be a lens for use in preventing or slowing the development or progression of myopia. The lens may be for use in providing an extended depth of focus to a myopic eye. A spectacle lens may comprise PMMA, CR-39, polycarbonate, Trivex, or crown glass.

An ophthalmic lens according to the present disclosure comprises an optic zone. The optic zone encompasses the parts of the lens that have optical functionality. The optic zone is configured to be positioned over the pupil of an eye when in use. For ophthalmic lenses according to the present disclosure, the optic zone comprises the central region, and a first annular region (or regions) circumscribing the central region.

The optic zone may be surrounded by a peripheral zone. The peripheral zone is not part of the optic zone. For embodiments of the present disclosure wherein the ophthalmic lens is a contact lens, the peripheral zone may sit outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens. The peripheral zone may have a substantially circular outer perimeter. In embodiments of the present disclosure wherein the lens is a spectacle lens, the peripheral zone may sit outside the optic zone and may have a substantially circular outer perimeter. The peripheral zone may extend to the edge of the spectacle lens. The peripheral zone may be surrounded by a further zone that provides a mechanical function.

For embodiments of the present disclosure wherein the ophthalmic lens is a contact lens, the peripheral zone may include a ballast to orient the lens when positioned on the eye of a wearer. Embodiments of the disclosure incorporating a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye. It may be that the contact lens of the present disclosure provides particular benefit to the wearer in a given orientation.

For embodiments of the present disclosure wherein the ophthalmic lens is a spectacle lens, the lens may be substantially circular in shape. The lens may be elliptical in shape. The lens may be oval in shape. The lens may be rectangular in shape. The lens may be square in shape. An anterior surface of the lens may have an area of between 1200 mm$^2$ and 3000 mm$^2$.

In embodiments of the present disclosure wherein the ophthalmic lens is a contact lens, the lens may be substantially circular in shape, and may have a diameter from about 3 mm to about 20 mm, preferably from about 13 mm to about 15 mm. The optic zone of the ophthalmic lens may be substantially circular in shape and may have a diameter from about 3 mm to about 10 mm, preferably from about 7 mm to about 9 mm.

The optical axis of the lens is defined with reference to a distant point source of light. Light from a distant point source that is on the optical axis of the lens (which may hereafter be referred to as an on-axis distant point source) will be focused onto the optical axis of the lens. The optical axis may lie along the centreline of the lens. For example, where the lens is a contact lens, the optical axis generally lies along the centreline of the lens. However, the optical axis may of course not lie along the centreline of the lens; this may be the case in a spectacle lens, where the position of the optical axis of the lens will be determined by the interpupillary distance of the wearer, which, depending on the lens geometry, may not coincide with the centreline of the lens.

In basic ray optics, rays from distant point objects that pass through a simple lens cross the optical axis at a focal point, which is at a particular distance from the lens. The power of the lens is the inverse of that distance. Because the power of the lens, as so defined, can be calculated from where the rays cross the optical axis, it is sometimes referred to as the "axial power".

In a wave-optics interpretation of focusing, the focal point where the rays normal to the wavefront cross the optical axis is determined by the slope (i.e. 1st derivative) of the wavefront after the wavefront has passed through the lens. Thus, the power, which is still the inverse of the distance to the focal point, is also sometimes referred to as the "slope power".

In a simple lens, the focal point where the rays normal to the wavefront cross the optical axis can also be derived from the curvature of the lens. Specifically, it is related to the curvature (i.e. 2nd derivative) of the wavefront after the wavefront has passed through the lens. Thus, the power, which is still the inverse of the distance to the focal point, is also sometimes referred to as the "curvature" power. For a simple lens, this is equal to the slope power and is just the power of the lens as it would normally be understood in basic optics.

Thus, for a simple lens, the "power", the "axial power", the "slope power" and the "curvature power" are all the same thing.

Lenses that are not simple lenses, can have more than one power, and so the term "power" needs to be qualified.

Where astigmatism is present, in an otherwise simple lens, the rays do not cross the optical axis at a single point but rather they form two orthogonal line foci. The inverse of the distances to those two line foci means that the lens has two powers, the sagittal power and the tangential power. The sagittal power, in the relevant plane, is still just the power of the lens (in that plane) as it would normally be understood in basic optics.

As optical surfaces become still more complicated, however, the different ways in which "power" can be defined start to become important. In particular, rays from different parts of the optical surface can cross each other at different points, and so you can identify different powers.

On the one hand, you can—as before—consider the point where rays cross the optical axis, and—as before—define the power as the inverse of the distance to that point. It is clearly the "axial power" of the lens: it is defined by where the rays cross the optical axis. It is also the "slope power" of the lens: it can be derived from the slope of the wavefront. In the appropriate plane, it is the "sagittal power" of the lens, as the term is conventionally understood.

However, on the other hand, you can consider where rays that pass through a small region of the lens cross each other. That point can be understood to be a local focal point, and it will not generally be on the optical axis of the lens. Clearly, the value of this local power will be different from the value of the axial power, and hence also different from the slope power and the sagittal power. But this local power arises from the local curvature of the optical surface, and it still depends on the curvature of the wavefront that has passed through that local region. It is equal to the "curvature power" as defined above. It is also sometimes called the "instantaneous power" because it is the power of an infinitesimally small region of the surface. It is also sometimes called the "local power", for obvious reasons.

Note that the slope power, being the 1st derivative of the wavefront, is also a property that can change from point to point on an optical surface, but it has a different value from the curvature power, which is the 2nd derivative of the wavefront. The slope power is the inverse of the distance at which the rays passing through the point pass the optical axis of the lens. The curvature power is the inverse of the distance at which rays passing close to the point pass each other.

In general optics, the word "sagittal" is used when describing oblique astigmatism. Oblique astigmatism occurs when rays from an off-axis location pass through a lens obliquely. The astigmatism is mostly attributable to the cosine compression that occurs in the meridian along which the rays originate, e.g., if the rays originate from the horizontal peripheral field, the surface (and hence radius of curvature) horizontally will appear to be cosine compressed, resulting in increased power in that meridian (and hence astigmatism). The power in that meridian is labelled "tangential" power and the power in the perpendicular meridian is labelled "sagittal" power. The astigmatism results in object points being imaged to two spatially separated and orthogonal line foci, the sagittal focal line and the tangential focal line.

The word "sagittal" is also used in descriptions of optical surfaces, for example in ophthalmology, where it is central to the clinical measurement of the anterior eye surface (i.e., in corneal topography). Sagittal optical power is determined by the slope of the optical surface along a given direction; it is also referred to as slope-based power. As discussed above, terms including "sagittal power", "slope power" and "axial power" are synonyms used interchangeably to describe the optical power of a surface of a lens obtained from the position at which rays passing through the surface cross the optical axis. Curvature power is determined by the local curvature of the optical surface along a given direction.

In the present disclosure, the term 'sagittal' is used in the context of an optical surface, to describe the sagittal power of a surface of an ophthalmic lens. The curvature power of the ophthalmic lenses is also described. Both the sagittal and curvature powers are defined along a given direction. For ophthalmic lenses according to embodiments of the present disclosure, the radial sagittal and radial curvature powers are along a direction extending radially outwards from the optical axis of the lens. The circumferential sagittal and circumferential curvature powers are along a direction that is perpendicular to that radial direction. However, the values of the sagittal power or slope power and curvature power can be very different from each other for some recently developed myopia-control lenses that employ non-coaxial optics. These lenses have surface regions that focus light from an on-axis light source onto regions displaced from the optical axis, so that the distance at which local ray bundles from the source come to a focus can be very different from the distance at which they cross the optical axis. For these types of lenses, the distinction between sagittal (axial) and curvature (local) power becomes important. With non-coaxial optics, a description of the curvature power does not provide a complete description of the optics. Adjacent regions of a lens can have the same curvature power but not the same sagittal power (because rays from each region cross the axis at different distances from the local focal distance and from each other). For a lens that includes non-coaxial lenslets, for example, the resulting sagittal and curvature power values differ significantly. A curvature power map of such a lens shows the constant add power of each lenslet, but a sagittal power map reveals a declining sagittal power with increasing radial distance.

Sagittal power is directly linked to the ray location at the image plane (retina plane in the eye) and therefore directly linked with image quality. This is not necessarily the case for curvature power when non-coaxial optics are implemented.

Sagittal and curvature powers of ophthalmic lenses can be determined by measuring a wavefront of light passing through a lens. When describing optical wavefronts that have passed through a lens, the radial sagittal power of a lens at a given point is related to the first derivative of the wavefront, as it is calculated as the slope of the wavefront divided by the radial distance (r) from the optical axis of the lens (typically the centre of the lens). The radial (local) curvature power at that point is calculated as the second derivative of the wavefront.

An example way, in practice, to measure the wavefront of light passing through an ophthalmic lens is to use an aberrometer, for example a Shack-Hartmann aberrometer with a (monochromatic, i.e., narrow-band) 540 nm light source, such as ClearWave® (available, from www.lumetrics.com). A Shack-Hartmann aberrometer includes a planar regular array of small lenses. In use, the wavefront to be measured is sampled by a two-dimensional array of small lenses (lenslets) each focusing a different part of the wavefront to a different focal spot. If the wavefront is planar, the spatial arrangement of the resulting point spread functions will mirror the arrangement of the lenses, so the lenses focus the wavefront to a corresponding regular array of focal spots.

Aberrometer-derived measures of optical wavefronts are typically quantified relative to standard reference cases. For example, when the Shack-Hartmann aberrometer is being used, the standard reference is typically a planar wavefront passing through the two-dimensional array of small lenses (lenslets), as just described.

The effect of a given lens on the wavefront is measured by inserting the lens into the measurement path at a location optically conjugate with the lenslet array. A planar wavefront then passes through the two-dimensional array of lenslets, and through the lens.

For a simple lens, the resulting wavefront will be a diverging or converging wavefront which produces an array of points that are displaced relative to their positions when the lens is absent. In practice, the magnitude and direction of the displacement of the points may also result from additional aberrations of the lens. A wavefront error map is determined by measuring the displacement of the shifted points from the regular array of focal spots, and the wavefront error map can be used to calculate the sagittal and curvature power of the lens.

The wavefront phase is estimated from the discrete slope measurements, typically using numerical fitting method or numerical integration. The more common approach is to fit the slope data with a series of polynomials that are themselves the differentials of a set of basis functions, the Zernike polynomials. The wavefront $W(x, y)$ is represented as a series of k polynomials $$Z_n^k$$

of order n, having coefficients $$C_n^k,$$

thus:

$$W(x, y) = \sum_n \sum_k C_n^k Z_n^k \tag{1}$$

Differentiating that expression provides the relationship between the slope of the wavefront and the differential of the Zernike polynomials:

$$\frac{\partial W(x, y)}{\partial x} = \sum_n \sum_k C_n^k \frac{\partial Z_n^k}{\partial x} \tag{2}$$

$$\frac{\partial W(x, y)}{\partial y} = \sum_n \sum_k C_n^k \frac{\partial Z_n^k}{\partial y} \tag{3}$$

The coefficients $$C_n^k$$

are obtained by fitting the differentiated Zernike polynomials to the measured wavefront slopes using (2) and (3). The wavefront $W(x, y)$ is thereby calculated as a series of Zernike basis functions $$Z_n^k$$

with the coefficients $$C_n^k$$

obtained by fitting the first derivatives of the basis functions to the measured wavefront slope data.

A second approach, typically applied to data that cannot be fitted by polynomials (e.g. where a lens power profile has abrupt local changes) employs numerical integration, for example by calculating the value at a point from the value at an adjacent point and the rate of change of that value at the adjacent point.

The effect of a given lens on the wavefront is measured by inserting the lens into the measurement path at a location optically conjugate with the lenslet array.

Thus, wavefront slopes and error maps may be measured at intervals across the lens, for example across the optic zone of a contact lens. A single-pass Shack-Hartmann aberrometer with a (monochromatic, i.e., narrow-band) 540 nm light source, such as ClearWave® (available, from www.lumetrics.com), may be used, for example, to measure wavefront slopes every 104 μm across a 10 mm aperture.

In the real world, measured wavefronts will not be ideal planar or spherical wavefronts. As explained above, aberrometer derived measures of optical wavefronts are typically quantified relative to standard reference cases, typically a plane wave or a spherical wave expected from the known power of a lens being measured. The former approach results in a wavefront error map including all optical power and aberrations (lower and higher order) of a lens.

Often, the wavefront being measured is known not to be planar even in theory, for example because it is known to be a diverging or converging wavefront, for example from a lens with negative or positive power, respectively. Thus, in the aberrometer, the focal points obtained from a converging or diverging wavefront are expected to be shifted from the regular array and aberrations of a lens can be isolated by subtracting the expected spherical wavefront from the measured wavefront. Specifically, in the aberrometer, the measured shift of individual spot images will be different from the expected shift, and the wavefront error is calculated from those differences. The wavefront error map obtained by subtracting the expected spherical wavefront (due to a lens of specified power) from the measured wavefront does not include the optical power of that lens but can include lower order (prism, defocus and astigmatism) and higher order (e.g., coma and spherical aberration) aberrations.

If the wavefront is tilted, the array of focal spots will be shifted in X and Y, and in the presence of other optical aberrations the focal point array will not replicate the lenslet array geometry. Rather, a part of a non-planar wavefront will arrive at a lens at an angle (i.e. not at normal incidence) and so the lens focuses that part of the wavefront to a focal spot that is shifted transversely from where it would have been had the wavefront been planar. The size of the transverse shift depends upon the average local slope, relative to a planar wavefront, of the part of the wavefront that is imaged by the lens. The distances by which the focal points are shifted by the array of lenses thus provides a measurement of the wavefront slopes at corresponding parts of the wavefront.

As discussed above, numerical fitting or numerical integration methods may be used to compute wavefront error maps of the pupil from the measured wavefront slopes. The wavefront error maps may be corrected for prism (prism may be removed from the wavefront error data because it can corrupt the calculation of sagittal power).

With the wavefront error map oriented so that the principal curvature directions are horizontal (x) and vertical (y), the wavefront error W(x,y) has local horizontal and vertical slopes $$\left( \frac{\partial W}{\partial x}, \frac{\partial W}{\partial y} \right)$$

which may be obtained from the measured wavefront error, for example using numerical differentiation. Sagittal power (i.e., slope power or axial power) at each sampled location is here the wavefront error slope divided by the distance r of the sampled location from the lens centre; so, for example, radial sagittal power is defined as $$P_{sagittal} = \frac{1}{r} \frac{\partial W}{\partial r}$$

where $r^2 = x^2 + y^2$.

Mean curvature power is defined as the local mean curvature of the wavefront error, i.e.

$$P_{curvature} = \frac{1}{2} \left( \frac{\partial^2 W}{\partial x^2} + \frac{\partial^2 W}{\partial y^2} \right).$$

The Laplacian operator $$\nabla^2 = \frac{\partial^2}{\partial x^2} + \frac{\partial^2}{\partial y^2}$$

averages the local curvature across all X-Y directions. The Laplacian curvature power is defined as being twice the mean curvature. The Laplacian curvature of a sphere of a given radius will be twice the Laplacian curvature of a cylinder having the same radius. (Similarly, the mean curvature of the sphere will be twice the mean curvature of the cylinder.)

The radial curvature power is defined as:

$$P_{curvature}^{radial} = \frac{\partial^2 W}{\partial r^2}$$

Similarly, the circumferential (or tangential) curvature power along the direction of changing angle θ, orthogonal to the radius, is defined as:

$$P_{curvature}^{circumf} = \frac{\partial^2 W}{\partial \theta^2}$$

Consider, for example, a lens that has a central region having a sphere power and an annulus having an add power and surrounding the central region, wherein the annulus is a surface of a toroid, not a sphere, i.e., the add power is focused, not to a point on the optical axis, but rather to a ring of off-axis points. In the annulus, the radial curvature will be greater than the circumferential or tangential curvature. As described above, an aberrometer will typically subtract the sphere power of the lens. The remaining curvature is in a radial direction, across the annulus; circumferentially the curvature is flat (as the spherical curvature has been removed). A local x-y differentiator like the Laplacian operator, measures the average change in slope; in cases in which the residual circumferential change in curvature is zero after the sphere power is subtracted, the measured power will therefore be half the radial curvature, so the measured curvature power derived using the Laplacian operator is doubled to give the measured radial curvature power of the toroid.

Thus for lenses described herein and according to embodiments of the present disclosure, the radial sagittal power (i.e., slope power or axial power) at a given location is the first derivative with respect to r of the wavefront error (i.e. the wavefront error slope, which may for example be obtained from a wavefront error map), divided by r, where r is the radial distance of that location from the optical axis of the lens; so radial sagittal power is defined as $$P^{radial}_{sagittal} = \frac{1}{r}\frac{\partial W}{\partial r}.$$

And for lenses described herein and according to embodiments of the present disclosure, the radial curvature power at a given location is the second derivative with respect to r of the wavefront error (which may for example be obtained from a wavefront error map), where r is the radial distance of that location from the optical axis of the lens; so radial curvature power is defined as:

$$P^{radial}_{curvature} = \frac{\partial^2 W}{\partial r^2}.$$

An eye will typically suffer from spherical aberration. Spherical aberration of an eye may be spherical aberration of the lens of an eye, and/or spherical aberration of the retina. Spherical aberration causes light rays passing from through the periphery of an eye to focus to a different location, compared to light rays passing through the centre of an eye.

Spherical aberration may cause a decrease of the radial sagittal power of an eye with increasing radial distance from the optical axis of the eye. This is often the case for young eyes (eyes of children and young adults). Lenses according to the present disclosure correct for spherical aberration of a lens wearer's eye in cases where the spherical aberration causes a decrease in the radial sagittal power profile of the eye with increasing radial distance from the optical axis of the eye. The amount of spherical aberration of a lens wearer's eye will vary depending on whether distant or near objects are being viewed. When an eye is in a non-accommodating state (i.e., when viewing distant objects), the effect of spherical aberration will be less than when an eye is in an accommodating state (i.e., when viewing near objections).

It should be noted that for other lens wearers (for example, older adults), as a result of spherical aberration, the radial sagittal power profile of the lens of an eye may increase with increasing radial distance from the optical axis of the eye, following a curved profile. Lenses according to the present invention do not correct for spherical aberration of a lens wearer's eye that results in an increase in radial sagittal power with increasing radial distance from the optical axis.

When an ophthalmic lens according to present disclosure is worn by a lens wearer, the effective radial sagittal power experienced by the lens wearer will be the sum of the radial sagittal power of the eye and the radial sagittal power of the ophthalmic lens.

The central region of the ophthalmic lens according to the present disclosure may be substantially circular in shape and may have diameter of between about 2 and 9 mm, and preferably may be between about 2 and about 4 mm. The central region may be substantially oval in shape. The central region may be substantially elliptical in shape.

The radial sagittal power and radial curvature power of the central region may result from a curvature of a surface of the lens. The radial sagittal power and radial curvature power of the central region may result from a curvature of an anterior surface of the lens and/or a centre of curvature of a posterior surface of the lens.

The central region of lenses according to the present disclosure incorporates a correction for spherical aberration of a lens wearer's eye, in cases where the spherical aberration of the eye causes a decrease in radial sagittal power with increasing radial distance from the optic axis of the eye. Across the radial width of the central region, the radial sagittal power profile increases with increasing radial distance from the optical axis of the lens. The gradient of the radial sagittal power profile increases with increasing radial distance from the optical axis following a first curve, thereby compensating for a decrease in radial sagittal power caused by spherical aberration of the lens wearer's eye.

Across the radial width of the central region, the radial sagittal power may increase by between 0.01 D and 3.0 Dioptres (D). The gradient of the radial sagittal power profile across the central region may vary between 0 D/mm and 3.0 D/mm. For example, the gradient may increase from 0 D/mm to 0.8 D/mm with increasing distance from the optical axis, following the first curve.

The radial sagittal power profile across the central region may have an opposite profile to a curve that plots the decrease in radial sagittal power of a lens wearer's eye with increasing radial distance from the optical axis of the eye, as a result of spherical aberration. The first curve may be a parabolic curve, or may include a parabolic component. The first curve may increase or decrease smoothly and continuously with increasing radial distance from the optical axis of the lens. The gradient of the first curve may increase with increasing radial distance from the optical axis of the lens, to compensate for increasing spherical aberration of the lens wearer's eye with increasing radial distance from the optical axis of the eye.

Ophthalmic lenses for treatment of myopia are typically designed to provide a lens wearer with a constant radial sagittal power profile and a constant radial curvature power spanning the central region of the lens. The central region of the lens is typically used for distance vision.

For lenses according to the present disclosure, the central region provides a distance corrective radial curvature power. For lenses used in the treatment of myopia, the distance corrective radial curvature power will be negative or close to zero. The distance corrective radial curvature power may be between +0.5 and −25.0 D, preferably between +0.5 and −15.0 D.

The distance corrective radial curvature power may be constant across the central region. The radial sagittal power across the central region of the lens will increase with increasing radial distance from the optical axis, to compensate for a decrease in radial sagittal power of a lens wearer's eye as a result of spherical aberration, and in the case of perfect or ideal compensation, this may result in the lens wearer experiencing a constant radial sagittal power across the central region of the lens.

The nominal power of the central region will typically correspond to the labelled refractive power of the contact lens as provided on the contact lens packaging (though in practice it may not have the same value). This will typically be the average curvature power taken across the central region. The measured power of the central region is the directly measured average refractive curvature power taken across the central region. This may differ from the nominal power.

Typical lenses for reducing progression of myopia have at least one add power region that has a greater radial curvature add power than the central region. Hereafter, a difference in radial curvature power between an add power region the distance corrective radial curvature power of the central region may be referred to as a radial curvature add power, or a curvature add power. For lenses according to the present disclosure a first annular region circumscribes the central region and provides a radial curvature add power.

The first annular region may provide a radial curvature add power of between +0.5 D and +20.0 D, preferably between +0.5 D and +10.0 D. The first annular region may provide a radial curvature add power of +2.0 D, +3.0 D, +4.0 D, or +12.0 D. The first annular region may provide a radial curvature add power that is at least +10.0 D. The radial curvature add power may be constant across the radial width of the first annular region.

The first annular region may provide a radial sagittal add power. Hereafter, a difference in radial sagittal power between an add power region and the radial sagittal power at the radial midpoint of the central region may be referred to as a radial sagittal add power, or sagittal add power. The radial sagittal power may be approximately constant across the radial width of the first annular region. The radial sagittal power across the first annular region may be a radial sagittal add power of between +0.5 D and +20.0 D, preferably between +0.5 and +4.0 D. The radial sagittal power across the first annular region may be a radial sagittal add power of +2.0 D or +3.0 D. There may be a sharp increase in radial sagittal power at the boundary between the central region and the first annular region. The sharp increase may be a sharp increase of +2.0 D. Alternatively, there may be a sharp decrease in radial sagittal power at the boundary between the central region and the first annular region. The sharp decrease may be a decrease of between 0.5 D and 2.5 D. The radial sagittal power may increase with increasing radial distance from the optical axis. The radial sagittal power may increase with increasing radial distance from the optical axis with a gradient of between 1.0 D/mm and 20.0 D/mm. The radial sagittal power may increase with increasing radial distance from the optical axis with a gradient of between 4.0 D/mm and 12.0 D/mm. The average radial sagittal power across the first annular region may be an add power of between +0.5 and +4.0 D, for example about +2.0 D or +3.0 D. The average radial sagittal add power across the first annular region may be zero.

In embodiments of the present disclosure, the central region has a radial sagittal power profile that compensates for the spherical aberration profile of a lens wearer's eye. The first annular region may have a radial sagittal power profile that compensates for the spherical aberration profile of a lens wearer's eye. Alternatively, the first annular region may have a radial sagittal power profile that is uncorrected for spherical aberration. In this case, the first annular region of the lens may have a substantially flat radial sagittal power profile or a radial sagittal power profile that increases with increasing distance from the optical axis with a constant gradient.

Across the radial width of the first annular region, the radial sagittal power profile may increase with increasing radial distance from the optical axis of the lens, thereby compensating for a decrease in radial sagittal power caused by spherical aberration of the lens wearer's eye. Across the radial width of the first annular region, the gradient of the radial sagittal power profile may increase with increasing radial distance from the optical axis following a second curve, thereby compensating for a decrease in radial sagittal power caused by spherical aberration of the lens wearer's eye.

Across the radial width of the first annular region, the radial sagittal power may increase by between 0.01 D and 10.0 D. The gradient of the radial sagittal power profile across the first annular region may be greater than 0 D/mm and less than 10.0 D/mm. The gradient of the radial sagittal power profile across the first annular region may be between 1.0 D/mm and 20.0 D/mm. The gradient of the radial sagittal power profile across the first annular region may be between 4.0 D/mm and 12.0 D/mm. The gradient of the radial sagittal power profile across the first annular region may increase with increasing distance from the optical axis. For example, the gradient may increase from 0 D/mm to 1.9 D/mm, from 1.0 D/mm to 9.0 D/mm, or from 0.5 to 7.8 D/mm.

The radial sagittal power profile across the first annular region may have an opposite profile to a curve that plots variation in radial sagittal power of a lens wearer's eye with increasing radial distance from the optical axis of the eye, as a result of spherical aberration. The second curve may be a parabolic curve, or may include a parabolic component. The second curve may increase smoothly and continuously with increasing radial distance from the optical axis of the lens. The gradient of the second curve may increase with increasing radial distance from the optical axis of the lens, to compensate for increasing spherical aberration of the lens wearer's eye with increasing radial distance from the optical axis of the eye.

Lenses according to the present disclosure may be based on known lenses for reducing the progression of myopia, such as the type A, type B, and type C lenses that are described below.

A first type of lens (which may hereafter be referred to as a type A lens) for reducing the progression of myopia comprises a central region having a distance corrective radial curvature power, and having a constant radial sagittal power across its radial width. The central region may have a chord diameter of between 2.5 mm and 4 mm. The central region may have a chord diameter of between 2.7 mm plus or minus 0.04 mm. A first annular region circumscribes the central region. The first annular region provides a radial curvature add power, and a radial sagittal add power that matches the radial curvature add power across the radial width of the first annular region. The radial curvature power, which matches the radial sagittal power, may be +2.0 D or +3.0 D greater than the radial curvature power of the central region. At the boundary between the central region and the first annular region there is a sharp increase in radial sagittal power, and a sharp increase in radial curvature power. Across the width of the first annular region, the radial sagittal power is constant, and the radial curvature power is constant. The first annular region may have a radial width of between 0.5 mm and 1.5 mm. The first annular region may have a radial width of 0.7 mm plus or minus 0.01 mm.

A second lens for reducing progression of myopia (which may hereafter be referred to as a type B lens) comprises a central region and a first annular add power region that surrounds the central region. The central region provides a distance corrective radial curvature power, and has a constant radial sagittal power across its radial width. The central region may have a chord diameter of between 2.5 mm and 4 mm. A first annular region circumscribes the central region and provides a radial curvature add power. The first annular region may have a radial width of between 0.5 mm and 1.5 mm. At the boundary between the central region and the first annular region there is a sharp increase in radial curvature power. Across the radial width of the first annular region the radial curvature add power is constant. The radial curvature power across the first annular region may be between +2.0 D and +12.0 D greater than the radial curvature power of the central region. The radial curvature power across the first annular region may be +2.0 D, +3.0 D, +4.0 D, +10.0 D, or +12.0 D greater than the radial curvature power of the central region. The first annular region is radially tilted relative to the central region, and as a result, the radial sagittal power varies across the width of the first annular region. The radial sagittal power increases across the radial width of the first annular region, with a positive, constant gradient. The radial sagittal power may increase across the radial width of the first annular region with a gradient of between 1.0 D/mm and 20.0 D/mm. The radial sagittal power may increase across the radial width of the first annular region with a gradient of between 4.0 D/mm and 12.0 D/mm. The radial sagittal power may be less than the radial curvature power across the width of the first annular region. At the boundary between the central region and the first annular region, there may be a sharp decrease in the radial sagittal power. The sharp decrease may be a decrease of between 0.5 D and 2.5 D. The average radial sagittal power across the width of the first annular region may match the radial sagittal power at the radial midpoint of the central region (i.e., the average radial sagittal add power across the radial width of the first annular region may be zero). The radial sagittal power at a point halfway across the width of the annular region may match the radial sagittal power at the radial midpoint of the central region (i.e., the radial sagittal add power at a point halfway across the radial width of the first annular region may be zero).

A third lens for reducing the progression of myopia (which may hereafter be referred to as a type C lens) comprises a central region and a first annular region that surrounds the central region. The central region provides a distance corrective radial curvature power and has a constant radial sagittal power across its radial width. The central region may have a chord diameter of between 2.5 mm and 4 mm. A first annular region circumscribes the central region. The first annular region may have a radial width of between 0.5 mm and 1.5 mm. Similarly to the type B lens described above, the first annular region is radially tilted relative to the central region and the radial sagittal power varies across the radial width of the first annular region. The radial sagittal power increases across the radial width of the first annular region, with a positive, constant gradient. The radial sagittal power may increase across the radial width of the first annular region with a gradient of between 1.0 D/mm and 20.0 D/mm. The radial sagittal power may increase across the radial width of the first annular region with a gradient of between 4.0 D/mm and 12.0 D/mm. However, this third lens also includes additional radial sagittal add power in the first annular region compared to the first and second lenses, such that there is a sharp increase in both the radial sagittal power, and the radial curvature power, at the boundary between the central region and the first annular region. The sharp increase in radial sagittal power at the boundary between the central region and the first annular region may be an increase of +2.0 D. Across the width of the first annular region, the radial sagittal power is greater than the radial sagittal power of the central region (i.e., there is a radial sagittal add power across the radial width of the first annular region, and the radial sagittal add power increases across the radial width of the first annular region). At a point halfway across the radial width of the first annular region, the radial sagittal power may be +3.0 D or +4.0 D greater than the radial sagittal power of the central region. At a point halfway across the radial width of the first annular region, the radial curvature power may be between +2.0 D and +12.0 D greater than the radial curvature power of the central region. At a point halfway across the radial width of the first annular region, the radial curvature power may be +2.0 D, +3.0 D, +4.0 D, +10.0 D, or +12.0 D greater than the radial curvature power of the central region.

In the context of the present disclosure, the first annular region is a substantially annular region that circumscribes the optic zone. It may have a substantially circular shape or a substantially elliptical shape. It may fully surround the optic zone. It may partially surround the optic zone.

The first annular region may extend radially outwards from a perimeter of the central region by between about 0.1 to 4 mm, preferably between about 0.5 and 1.5 mm. For example, the radial width of the annular region may be about 0.1 mm to about 4 mm, and preferably may be about 0.5 mm to about 1.5 mm. The perimeter of the central region may define a boundary between the central region and the annular region, and the annular region may therefore be adjacent to the central region.

The first annular region may abut the central region. A blending region may be provided between the central region and the first annular region. The blending region should not substantially affect the optics provided by the central region and the annular region, and the blending region may have a radial width of 0.05 mm or less, although it may also be as wide as 0.2 mm, or as wide as 0.5 mm in some embodiments.

In embodiments of the present disclosure, the first annular region provides a radial curvature add power. The first annular region may provide a radial sagittal add power. The lens may be based on one of the three lens designs described above (type A, type B, or type C lenses) for reducing the progression of myopia described above, incorporating a correction for spherical aberration across at least the central region of the lens. At the boundary between the central region and the first annular region there may be a sharp increase in radial curvature power, and the radial curvature power across the first annular region may be constant. At the boundary between the central region and the first annular region there may be a sharp increase in radial sagittal power, or a sharp decrease in radial sagittal power. At the boundary between the central region and the first annular region there may be a change in gradient of the radial sagittal power profile.

In embodiments of the present disclosure, the central region is corrected for spherical aberration of a lens wearer's eye. The first annular region may be corrected for spherical aberration of a lens wearer's eye, or may be uncorrected for spherical aberration. The spherical aberration correction across the first annular region may be based on the same spherical aberration profile, or spherical aberration curve, as the spherical aberration correction across the central region. For example, the radial sagittal power profile for both the central region and the first annular region may include a correction for spherical aberration of a lens wearer's eye when the eye is in a non-accommodating state, based on the same curve. Alternatively, the spherical aberration correction across the first annular region may be based on a different spherical aberration profile, or spherical aberration curve, to the spherical aberration correction across the central region. For example, the radial sagittal power profile for the central region may include a correction for spherical aberration of an eye in an accommodating state based on a first curve, and the radial sagittal power profile for the first annular region may include a correction for spherical aberration of a lens wearer's eye in a non-accommodating state, following a second, different curve.

In embodiments of the present disclosure, the ophthalmic lens may be based on the type B lens described above, including a spherical aberration correction across at least the central region of the lens. The central region will include a spherical aberration correction as described above, and will have a radial sagittal power profile that increases with increasing radial distance from the optical axis of the lens. The gradient of the radial sagittal power profile will increase with increasing radial distance from the optical axis, following a first curve.

The first annular region will provide a radial curvature add power. There may be a sharp increase in radial curvature power at the boundary between the central region and the first annular region, and the radial curvature power may be approximately constant across the radial width of the annular region. The first annular region will be radially tilted relative to the central region. There may be a sharp decrease in the radial sagittal power at the boundary between the central region and the first annular region. Across the radial width of the first annular region, the radial sagittal power will increase with increasing radial distance from the optical axis as a result of radial tilting of the annular region relative to the central region. The gradient of the radial sagittal power profile may increase with increasing radial distance from the optical axis following a second curve as a result both the spherical aberration correction, and the radial tilting of the annular region relative to the central region.

For these embodiments, a spherical aberration correction based on the first curve will be applied to the central region. A spherical aberration correction based on a second curve may be applied to the first annular region. The first curve may be the same as the second curve. Alternatively, a spherical aberration based on a first curve may be applied to the central region, and a spherical aberration correction based on a second, different curve may be applied to the first annular region. In this case, the radial sagittal power at a point halfway across the radial width of the first annular region may lie above or below the first curve. Alternatively, the first annular region may be uncorrected for spherical aberration.

Across the radial width of the central region, the radial sagittal power may increase by between 0.01 D and 3.0 D. Across the radial width of the central region, the gradient of the radial sagittal power profile will increase following a first curve. The gradient of the radial sagittal power profile across the central region increases from 0 D/mm to 3.0 D/mm with increasing distance from the optical axis. For example, the gradient may increase from $2 \times 10^{-3}$ D/mm to 0.3 D/mm with increasing distance from the optical axis.

Across the radial width of the first annular region, the radial sagittal power may increase by between 0.1 D and 10.0 D. The gradient of the radial sagittal power profile across the first annular region may vary between 0.5 D/mm and 10.0 D/mm, preferably between 1.0 D/mm and 9.0 D/mm. For example, the gradient may increase from 6.0 D/mm and 6.8 D/mm. The gradient of the radial sagittal power profile across the first annular region may vary between 1.0 D/mm and 20.0 D/mm. The gradient of the radial sagittal power profile across the first annular region may vary between 4.0 D/mm and 12.0 D/mm.

The radial sagittal power across the width of the first annular region may increase from a first value that is below the first curve to a second value that is greater than the first curve.

In other embodiments of the present disclosure, the lens may be similar to the type A lens described above, including a spherical aberration correction across at least the central region of the lens. The central region will include a spherical aberration correction as described above, and will have a radial sagittal power profile that increases with increasing radial distance from the optical axis of the lens.

For these embodiments, the first annular region will provide a radial curvature add power and a radial sagittal add power. There may be a sharp increase in radial curvature power at the boundary between the central region and the first annular region, and the radial curvature power may be approximately constant across the radial width of the first annular region. There may be a sharp increase in the radial sagittal power at the boundary between the central region and the first annular region. Across the radial width of the first annular region, the radial sagittal power may increase with increasing radial distance from the optical axis, as a result of the spherical aberration correction. The gradient of the radial sagittal power profile may increase with increasing radial distance from the optical axis following a second curve, as a result of the spherical aberration correction. At an outer edge of the first annular region, the radial sagittal power may be greater than the radial curvature power.

A spherical aberration correction based on the first curve is applied to the central region. A spherical aberration correction based on a second curve may be applied to the first annular region. The first curve may be the same as the second curve. Alternatively, a spherical aberration based on a first curve may be applied to the central region, and a spherical aberration correction based on a second, different curve may be applied to the first annular region. Alternatively, the first annular region may be uncorrected for spherical aberration.

Across the radial width of the central region, the radial sagittal power may increase by between 0.01 D and 3.0 D. Across the radial width of the central region, the gradient of the radial sagittal power profile will increase with increasing radial distance from the optical axis of the lens, following a first curve. The gradient of the radial sagittal power profile across the central region may increase from 0 D/mm and 3.0 D/mm with increasing distance from the optical axis. For example, the gradient may increase from 0 D/mm to 0.8 D/mm with increasing distance from the optical axis.

Across the radial width of the first annular region, the radial sagittal power may be constant, or may increase by between 0.1 D and 3.0 D. Across the radial width of the first annular region, the gradient of the radial sagittal power profile may be zero, or may increase with increasing radial distance from the optical axis of the lens, following a first curve. The gradient of the radial sagittal power profile across the first annular region may vary between 0 D/mm and 3.0 D/mm. For example, the gradient may increase from 0.0 D/mm to 1.9 D/mm.

In embodiments of the present disclosure, the lens may be based on the type C lens described above, including a spherical aberration correction across at least the central region. The central region will include a spherical aberration correction as described above, and will have a radial sagittal power profile that increases with increasing radial distance from the optical axis of the lens. The gradient of the radial sagittal power profile will increase with increasing radial distance from the optical axis, following a first curve.

The first annular region will provide a radial curvature add power. There may be a sharp increase in radial curvature power at the boundary between the central region and the first annular region, and the radial curvature power may be approximately constant across the radial width of the annular region. There may also be a sharp increase in radial sagittal power at the boundary between the central region and the first annular region. For these embodiments, the first annular region will be radially tilted relative to the central region. Across the radial width of the first annular region, the radial sagittal power will increase with increasing radial distance from the optical axis as a result of radial tilting of the annular region relative to the central region. The gradient of the radial sagittal power profile may increase with increasing radial distance from the optical axis. The gradient of the radial sagittal power profile may increase with increasing radial distance from the optical axis following first curve as a result of both the spherical aberration correction, and the radial tilting of the annular region relative to the central region. Alternatively, the gradient of the radial sagittal power profile may decrease with increasing radial distance from the optical axis as a result of the spherical aberration correction.

A spherical aberration correction based on the first curve will be applied to the central region. A spherical aberration correction based on a second curve may be applied to the first annular region. Alternatively, the first annular region may be uncorrected for spherical aberration. In this case, the radial sagittal power profile of the first annular region may increase with increasing distance from the optical axis, with a constant gradient. Alternatively, a spherical aberration based on a first curve may be applied to the central region, and a spherical aberration correction based on a second, different curve may be applied to the first annular region.

Across the radial width of the central region, the radial sagittal power may increase by between 0.01 D and 3.0 D. Across the radial width of the central region, the gradient of the radial sagittal power profile will increase following a first curve. The gradient of the radial sagittal power profile across the central region may increase from 0 D/mm to 3.0 D/mm with increasing distance from the optical axis. For example, the gradient may increase from $2 \times 10^{-3}$ D/mm to 0.3 D/mm with increasing distance from the optical axis.

Across the radial width of the first annular region, the radial sagittal power may increase by between 0.1 D and 10.0 D. The gradient of the radial sagittal power profile across the first annular region may vary between 0.1 D/mm and 10.0 D/mm, preferably between 0.5 D/mm and 7.8 D/mm. For example, the gradient may increase from 4.8 D/mm and 5.6 D/mm. The gradient of the radial sagittal power profile across the first annular region may vary between 1.0 D/mm and 20.0 D/mm. The gradient of the radial sagittal power profile across the first annular region may vary between 4.0 D/mm and 12.0 D/mm.

Lenses according to embodiments of the present disclosure may include a second annular region circumscribing the first annular region. The second annular region may provide the distance corrective radial curvature power (i.e., the second annular region may have the same radial curvature power as the central region). The second annular region may include a spherical aberration correction that compensates for the spherical aberration of a lens wearer's eye, and may therefore have a radial sagittal power profile that increases with increasing radial distance from the optical axis. The gradient of the radial sagittal power profile across the second annular region may increase with increasing radial distance from the optical axis. The second annular zone may have a radial width of between 0.5 and 1.5 mm. The second annular zone may have a radial width of 0.6 mm plus or minus 0.01 mm.

A spherical aberration correction across a second annular region may be based on the same first curve as the spherical aberration correction across the central region.

A spherical aberration correction across a second annular region may be based on a different curve to the spherical aberration correction across the central region, i.e., the spherical aberration correction across a second annular region may be based on a curve that is different to the first curve.

Lenses according to embodiments of the present disclosure may include a third annular region circumscribing the second annular region. The third annular zone may have a radial width of between 0.5 and 1.5 mm. The third annular zone may have a radial width of 0.6 mm plus or minus 0.01 mm. The third annular region may provide a radial curvature add power. The third annular region may provide a radial curvature power that is between +2.0 D and +12.0 D more positive than the distance corrective refractive power of the central region. The third annular region may provide a radial curvature power that is +2.0 D, +3.0 D, +4.0 D, +10.0 D or +12.0 D more positive than the distance corrective refractive power of the central region. The third annular region may provide a radial curvature add power that is constant. The third annular region may provide an average radial curvature power that is +2.0 D, +3.0 D, +4.0 D, +10.0 D or +12.0 D more positive than the distance corrective refractive power of the central region. The radial curvature add power of the third annular region may be the same as the radial curvature add power of the first annular region. The radial curvature add power of the third annular region may be the greater than the radial curvature add power of the first annular region. The radial curvature add power of the third annular region may be less than the radial curvature add power of the third annular region. A spherical aberration correction may be applied to the third annular region. Alternatively, the third annular region may be uncorrected for spherical aberration.

A third annular region may have any of the features of the first annular region as set out above. A third annular region may have a radial sagittal power profile that increases with increasing radial distance from the optical axis. The gradient of the radial sagittal power profile across the annular region may increase with increasing radial distance from the optical axis.

A spherical aberration correction across a third annular region may be based on the same second curve as the spherical aberration correction across the first annular region, and/or the same first curve as the spherical aberration correction across the central region.

A spherical aberration correction across a third annular region may be based on a different curve to the spherical aberration correction across the first annular region and/or the central region, i.e., the spherical aberration correction across a second annular region may be based on a fourth curve that is different to the first curve and/or the second curve.

Lenses according to embodiments of the present disclosure may include a fourth annular region circumscribing the third annular region. The fourth annular region may provide the distance corrective radial curvature power (i.e., the fourth annular region may have the same radial curvature power as the central region). The fourth annular region may include a spherical aberration correction that compensates for the spherical aberration of a lens wearer's eye, and may therefore have a radial sagittal power profile that increases with increasing radial distance from the optical axis. The gradient of the radial sagittal power profile across the fourth annular region may increase with increasing radial distance from the optical axis. The fourth annular zone may have a radial width of between 0.5 and 1.5 mm. The fourth annular zone may have a radial width of 0.925 mm plus or minus 0.15 mm.

A spherical aberration correction across a fourth annular region may be based on the same first curve as the spherical aberration correction across the central region.

A spherical aberration correction across a fourth annular region may be based on a different curve to the spherical aberration correction across the central region, i.e., the spherical aberration correction across a fourth annular region may be based on a curve that is different to the first curve.

For embodiments wherein the spherical aberration across the central region, the first annular region and a second annular region is based on the same first curve, the radial sagittal power at a point halfway across the width of the first annular region, and the radial sagittal power at a point halfway across the width of the second annular region may lie on the first curve.

Alternatively, for embodiments wherein the spherical aberration correction across the central region is based on a first curve, and the spherical aberration correction across a first annular region is based on a second, different curve to the first curve, the radial sagittal power at a point halfway across the width of the central region will lie on the first curve, and the radial sagittal power at a point halfway across the width of the first annular region will lie on a second curve which may be above or below the first curve. The second curve may have a greater increase in gradient with increasing radial distance from the optical axis, compared to the first curve.

The ophthalmic lens may comprise a plurality of concentric annular regions that provide a radial curvature add power. Each concentric annular region may have any of the features of the first and second annular regions described above. The radial sagittal power across the radial width of each of the annular regions may increase or decrease with increasing radial distance from the optical axis. The gradient of the radial sagittal power profile across the radial width of each of the annular regions may increase with increasing distance from the optical axis, to compensate for spherical aberration of a lens wearers eye, following a first curve.

The radial sagittal power at a point halfway across the radial width of any or all of the annular regions may lie on the first curve. The radial sagittal power at a point halfway across the radial width of any or all of the annular regions may lie on a second curve that is different to the first curve. The second curve may provide a different spherical aberration correction. The second curve may lie above the first curve or below the first curve. The second curve may have a greater increase in gradient with increasing radial distance from the optical axis, compared to the first curve. In between any or all of the concentric annular regions that provide an add power, there may be regions of the lens that have a distance corrective radial curvature power. These may be referred to as distance corrective power regions.

Across the radial width of any of distance corrective power regions, the radial sagittal power may increase with increasing radial distance from the optical axis as a result of a spherical aberration correction. Across the radial width of any of the distance corrective power regions, the gradient of the radial sagittal power profile may increase with increasing radial distance from the optical axis.

For embodiments wherein the ophthalmic lens is a contact lens, the lens may comprise a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

According to a second aspect, the present disclosure provides a method of manufacturing an ophthalmic lens. The method comprises providing a spherical aberration power profile, the spherical aberration power profile being the variation in radial sagittal power for an eye, as a function of radial distance from an optical axis of the eye. The method comprises providing a target radial sagittal power profile for a lens wearer, the target radial sagittal power profile being the target variation in radial sagittal power as a function of radial distance from an optical axis of the eye of the lens wearer, where in the target radial sagittal power profile includes a central region having a distance corrective radial curvature power, and a first annular region that provides a radial curvature add power. The method comprises subtracting the spherical aberration power profile from at least the central region of the target radial sagittal power profile, thereby providing a corrected radial sagittal power profile for an ophthalmic lens. The method comprises manufacturing an ophthalmic lens having the corrected radial sagittal power profile.

The manufactured lens may be a lens including any of the features in accordance with a first aspect of the present disclosure, as set out above.

The target radial sagittal power profile may be a radial sagittal power profile based on a type A lens, a type B lens, or a type C lens, as described above.

The spherical aberration power profile may be a measured spherical aberration profile for a lens wearer. The spherical aberration power profile may be a modelled spherical aberration profile for a lens wearer. The spherical aberration power profile may be a computer modelled spherical aberration profile for a lens wearer. The spherical aberration power profile may be an average spherical aberration power profile, wherein the average may have been taken from a plurality of aspherical aberration power profiles measured or modelled for different lens wearers.

The spherical aberration power profile may be a measured, modelled, or average spherical aberration power profile obtained for an eye viewing distant objects. The spherical aberration power profile may be a measured, modelled, or average spherical aberration power profile obtained for an eye viewing near objects. The spherical aberration power profile may be an average spherical aberration profile, wherein the average is taken for an eye viewing near objects and an eye viewing distant objects.

The target radial sagittal power profile for a lens wearer may be a modelled profile. The steps of providing a spherical aberration power profile, providing a target radial sagittal power profile for a lens wearer, and subtracting the spherical aberration power profile from the target radial sagittal power profile, thereby providing a corrected radial sagittal power profile, may be computer-modelled steps.

The method may comprise providing a first spherical aberration power profile that plots variation in radial sagittal power for a lens wearer's eye, when the eye is in a first, non-accommodating state (i.e., the state that the eye would be in when viewing distant objects). The method may comprise providing a second spherical aberration power profile that plots variation in radial sagittal power for a lens wearer's eye when the eye is in a second, accommodating state (i.e., the state that the eye would be in when viewing near objects). The method may comprise subtracting the first spherical aberration power profile from the target radial sagittal power profile for the central region of the lens. The method may comprise subtracting the second spherical aberration power profile from the target radial sagittal power profile for the first annular region of the lens. The corrected radial sagittal power profile may therefore include a central region that is corrected such that it is optimised for distance vision, and a first annular region that is corrected such that it is optimised for distance vision.

For embodiments of the present disclosure wherein the ophthalmic lens is a contact lens, the method of manufacturing may comprise forming a female mold member with a concave lens forming surface and a male mold member with a convex lens forming surface. The method may comprise filling a gap between the female and male mold members with a contact lens formulation. The method may further comprise curing the contact lens formulation to form the lens.

For embodiments of the present disclosure wherein the ophthalmic lens is a contact lens, the lens may be a formed using a lathing process. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

Figure 1B:
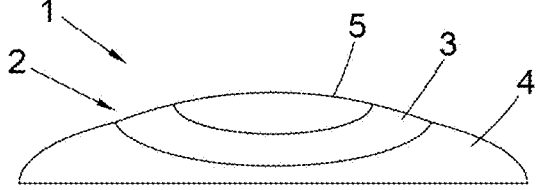
FIG. 1B is a side view of the contact lens of FIG. 1A.

FIG. 1A shows a schematic top view of a first ophthalmic lens (a type A lens) 1 for use in reducing the progression of myopia. The lens uses a treatment zone that provides a myopically defocused image to reduce the progression of myopia. FIG. 1B shows a schematic side view of the lens 1 of FIG. 1A.

The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, and providing a shaped region that improves comfort for the lens 1 wearer. The optic zone 2 provides the optical functionality of the lens 1, and the optic zone comprises an annular region 3 and a central region 5. The central region 5 has a distance corrective radial curvature power, which is equal to the radial sagittal power across the central region. The annular region 3 has a greater radial curvature power and radial sagittal power than the central region 5.

Figures 2A, 2B, 2C:
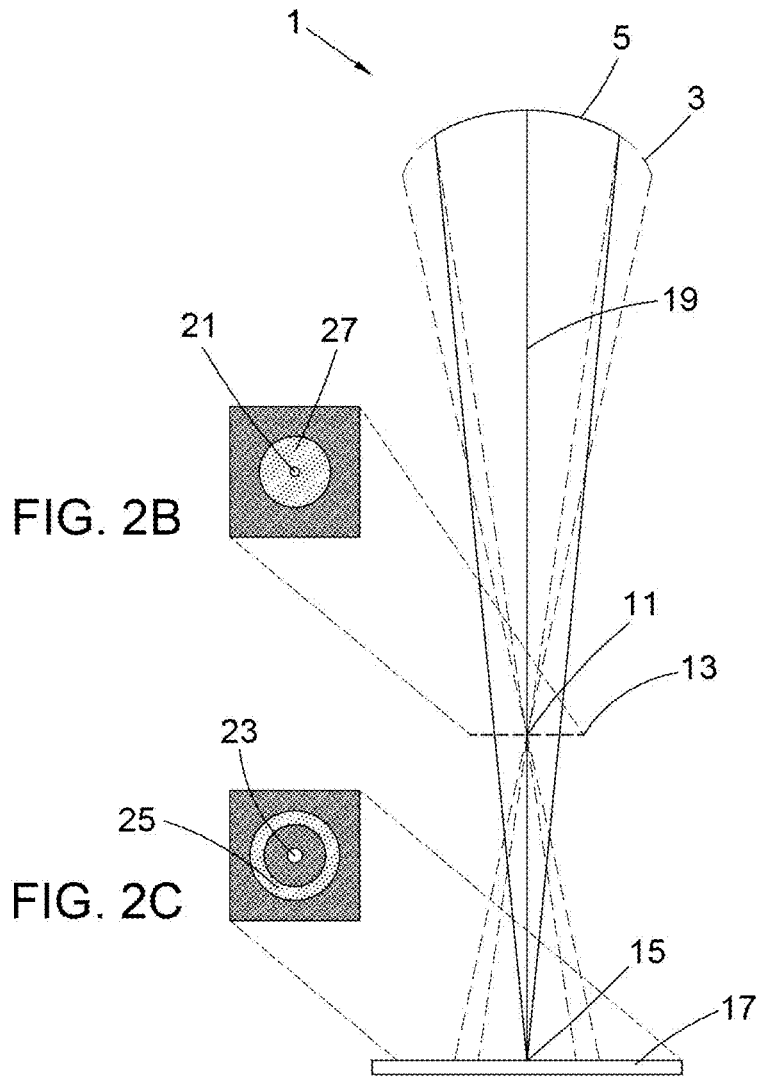
FIG. 2A is a ray diagram for the lens of FIG. 1A.
FIG. 2B shows a light pattern at a proximal focal surface of the lens of FIG. 1A formed from a distant point source.
FIG. 2C shows a light pattern at a distal focal surface of the lens of FIG. 1A formed from a distant point source.
Figure 3:
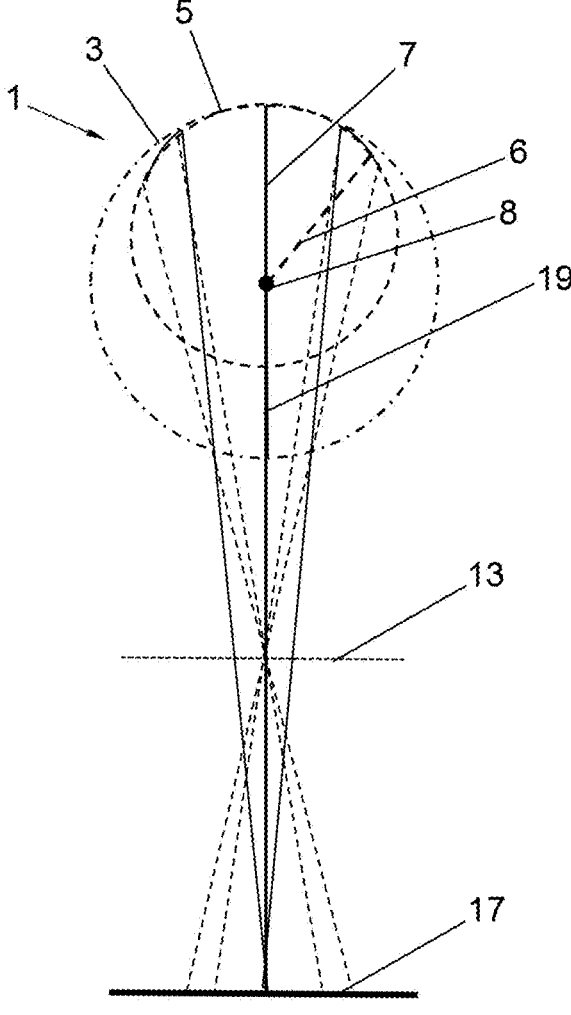
FIG. 3 is a partial ray diagram for the lens of FIGS. 1A and 1B together with circles indicating the radii of curvature of the central distance region (dashed-dotted line) and the annular add region (dashed line) of the lens.

As shown in FIGS. 2A and 3, the centre of curvature 8 of the central region 5 lies on a first optical axis 19 and the centre of curvature of the annular region 3 lies on the first optical axis 19. The focus 11 of the annular region 3 and the focus 15 of the central region 5 share a common optical axis 19. The focus 11 of the annular region 3 lies on a proximal focal surface 13 (proximal to lens 1), and the focus for the central region 5 lies on a distal focal surface 17 (distal to lens 1), which is further away from the posterior surface of the lens 1. As shown in FIGS. 2B and 2C, for a distant on-axis point source, light rays focused by the central region 5 form a spot 23 at the distal focal surface 17. Light rays focused by the central region 5 also produce an unfocused blur disc 27 at the proximal focal surface 13. Light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17. As discussed above, the unfocused annulus image 25 may result in wearers of the lens 1 seeing a 'halo' around focused distance images.

The radial curvature power of the annular region 3 is provided by a radius of curvature 6 of the annular region 3, which is smaller than the radius of curvature 7 of the central region 5, as shown in FIG. 3.

Figure 4A:
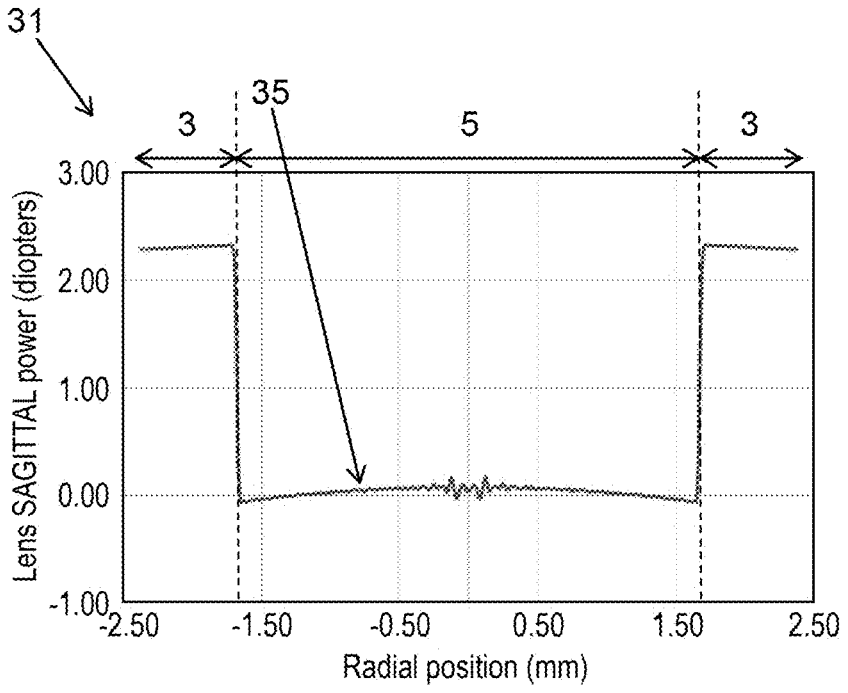
FIG. 4A is a plot showing the variation in radial sagittal power for the lens shown in FIGS. 1A and 1B.
Figure 4B:
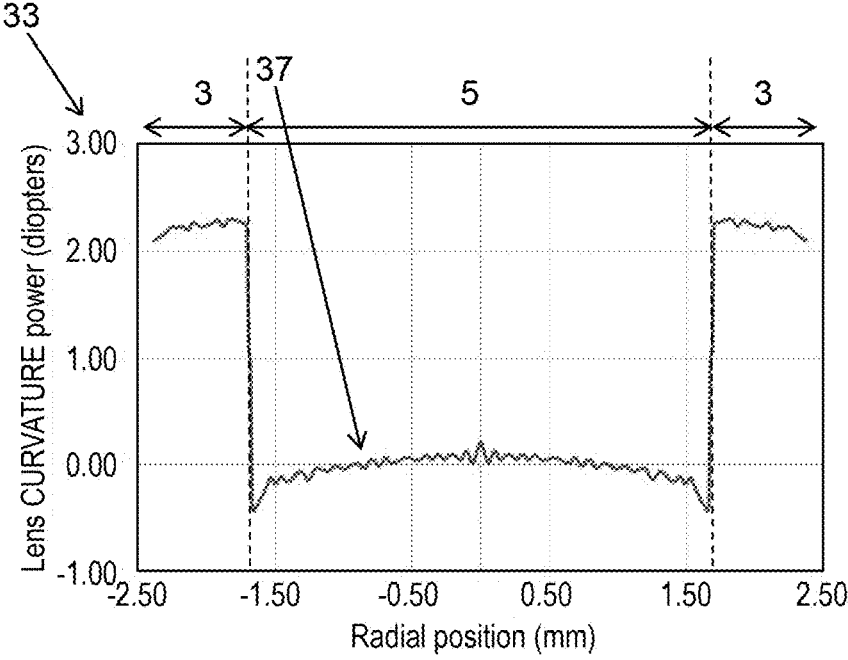
FIG. 4B is a plot showing the variation in radial curvature power for the lens shown in FIGS. 1A and 1B.

FIG. 4A is a plot 31 showing the variation in radial sagittal power 35 for the lens 1 shown in FIGS. 1A and 1B. FIG. 4B is a plot 33 showing the variation in radial curvature power 37 for the lens 1 shown in FIGS. 1A and 1B. FIGS. 4A and 4B show power variations along a radial diameter of the lens 1. The radial curvature power 37 is approximately equal to radial sagittal power 35 across the radial width of the lens 1. The annular region 3 has a greater radial curvature power 37 than the central region 5 (i.e., the annular region has a radial add curvature power, and as the annular region 3 has an on-axis centre of curvature, the radial sagittal power 35 is also greater across the annular region 3 than across the central region 5 (i.e., the annular region 3 has a radial sagittal add power).

Figures 5A, 5B, 5C:
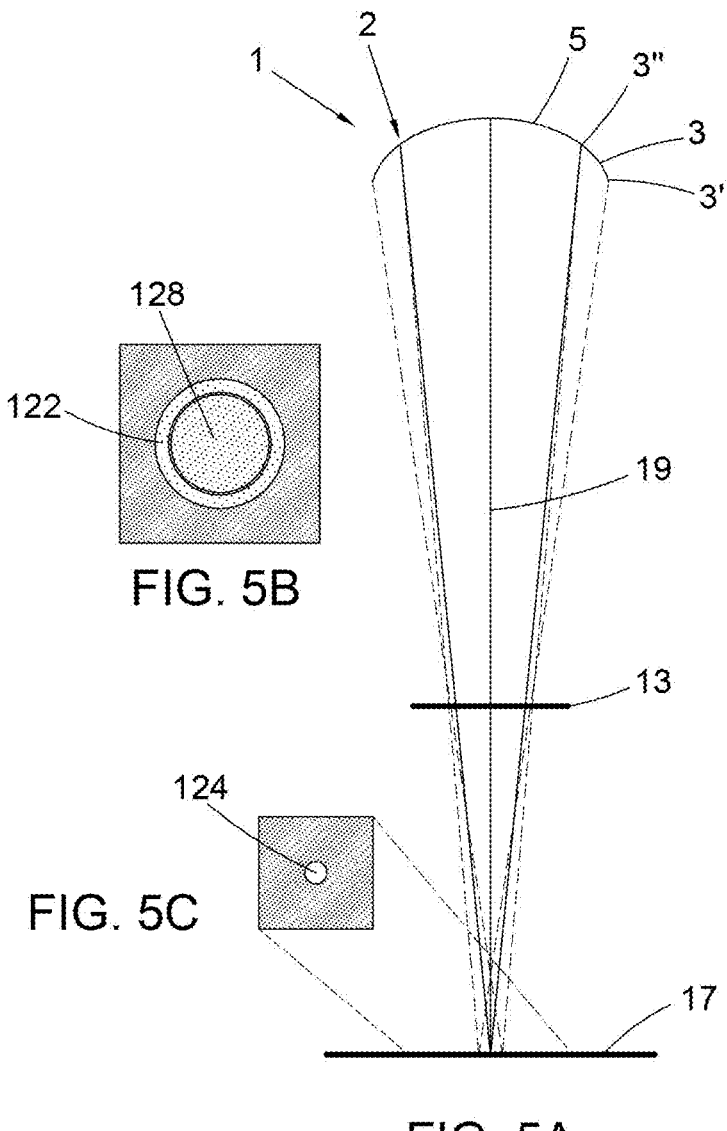
FIG. 5A is a ray diagram for a second known lens (a type B lens) for use in reducing progression of myopia, the lens having non coaxial optics.
FIG. 5B shows a light pattern at a proximal focal surface of the lens of FIG. 5A formed from a distant point source.
FIG. 5C shows a light pattern at a distal focal surface of the lens of FIG. 5A formed from a distant point source.

FIG. 5A shows a partial ray diagram for a second lens 1 (a type B lens) for use in reducing the progression of myopia. In the figures below, features that are the same or similar to features of the lens 1 shown in FIGS. 1A-3 are indicated using the same reference numerals.

Figure 5D:
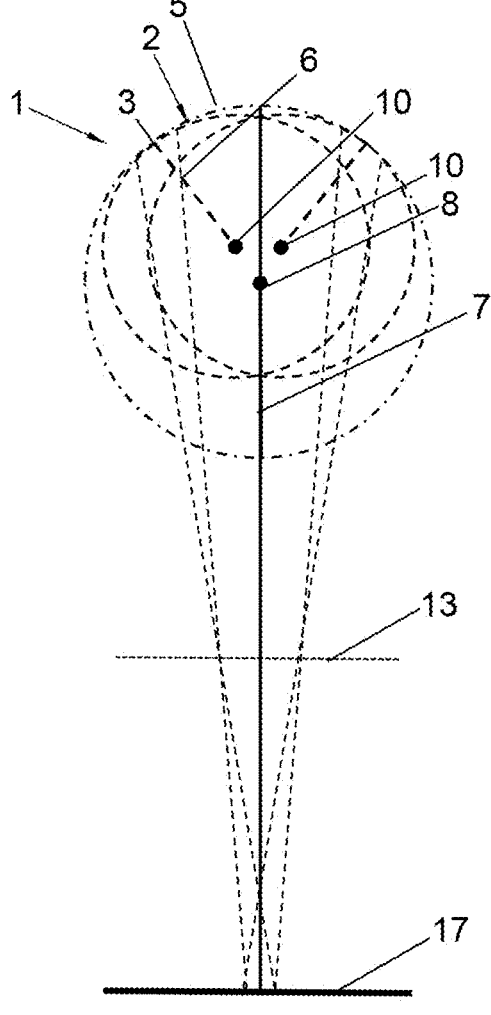
FIG. 5D is a partial ray diagram for the lens of FIG. 5A together with circles indicating the radii of curvature of the central distance region (dashed-dotted line) and the annular add region (dashed line) of the lens.

The lens 1 of FIG. 5A is similar to the lens 1 shown in FIGS. 1A and 1B, but the lens 1 of FIG. 5A has non coaxial optics. As shown in FIGS. 5A and 5D, a central region 5 of the lens 1 has a distance corrective radial curvature power, which is equal to the radial sagittal power across the central region. The centre of curvature 8 of the central region 5 lies on a first optical axis 19. An annular region 3 that surrounds the central region 5 has a greater radial curvature power than the central region 5.

In contrast to the lens 1 of FIGS. 1A and 1B, this lens 1 does not generate a single image or an on-axis image at the proximal focal surface 13 that could be used to avoid the need for the eye to accommodate for near objects. For a distant object, the focused image formed at the proximal focal surface 13 is a convolution of (i) the focused image of the extended object that would be obtained with a conventional lens having the optical power of the annular region 3 and (ii) an optical transfer function representing the optical effect of the annular region 3. At the proximal focal surface 13, for a distant on-axis point source, light rays passing through the central region 5 generate a blur disc 128 (shown in FIG. 5B), similar to the lens 1 of FIGS. 1A and 1B. However, light rays from a distant point source passing through the annular region 3 generate a focused annulus 122 (shown in FIG. 5B), which surrounds the blur disc 128.

Light rays passing through the central region 5 are focused at the distal focal surface 17. The annular region 3 acts as an optical beam stop, which leads to a small spot size of light 124 (shown in FIG. 5C) at the distal focal surface 17. In contrast to the lens 1 of FIGS. 1A and 1B, an annulus or 'halo' effect does not occur at the distal focal surface 17, or is greatly reduced.

The annular region 3 radial curvature power is provided by a radius of curvature of the annular region 3, which is smaller than the radius of curvature of the central region 5. However, in contrast to the lens 1 of FIGS. 1A and 1B, the curvature 10 of the annular region 3 cannot be defined by a single sphere, and a centre of curvature 10 of the annular region 3 does not lie on the first optical axis 19. This is shown in FIG. 5D. The annular region 3 is radially tilted relatively to the central region 5, so that the outer edge 3' of the annular region 3 is higher relative to its inner edge 3" than is the case in the lens 1 of FIGS. 1A and 1B. This alters the radial sagittal power of the annular region 3, but does not alter the radial curvature power of the annular region 3. As shown in FIG. 5D, the anterior surface of the central region 5 defines a portion of a surface of a sphere of larger radius 7. The anterior surface of the annular region 3 defines a curved annular surface with smaller radius 6.

Figure 6A:
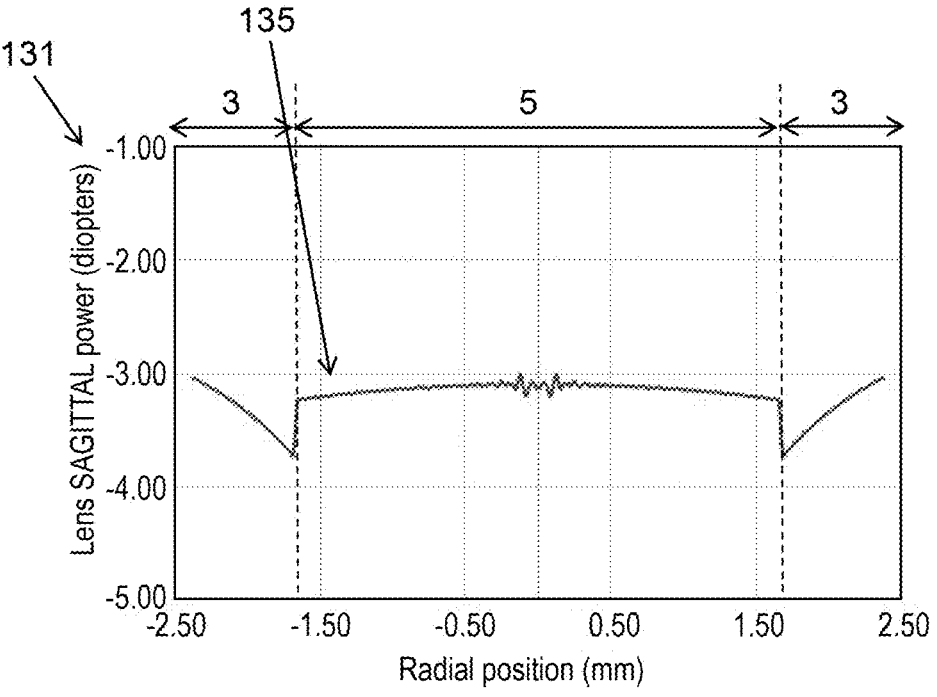
FIG. 6A is a plot showing the variation in radial sagittal power for the lens shown in FIG. 5A.
Figure 6B:
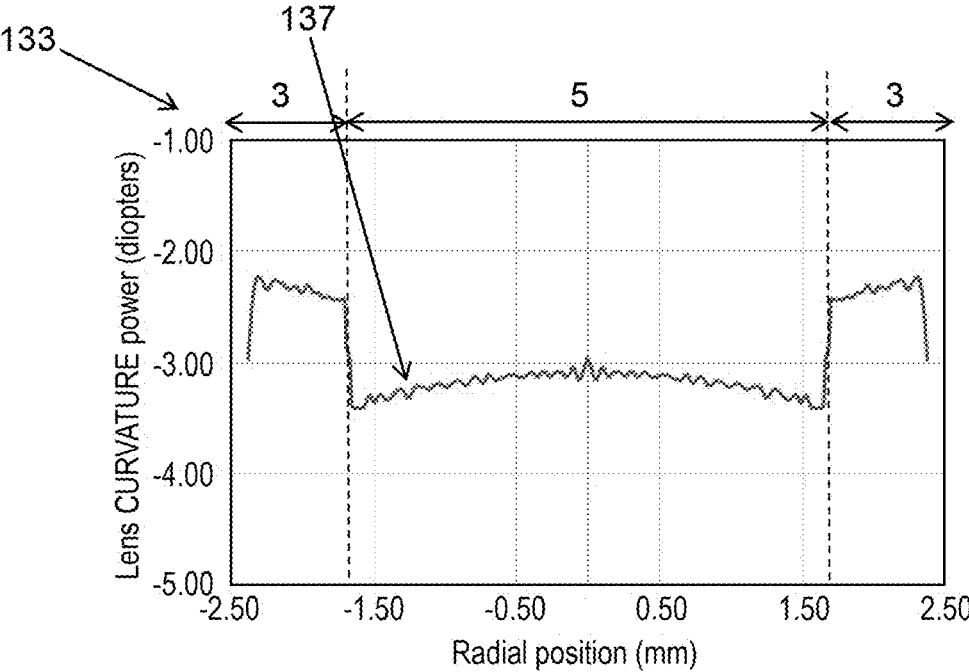
FIG. 6B is a plot showing the variation in radial curvature power for the lens shown in FIG. 5A.

FIG. 6A is a plot 131 showing the variation in radial sagittal power 135 for the lens 1 shown in FIGS. 5A-5D. FIG. 6B is a plot 133 showing the variation in radial curvature power 137 based power for the lens 1 shown in FIGS. 5A and 5D. FIGS. 6A and 6B show power variations along a radial diameter of the lens 1. For this lens 1, the annular region 3 is radially tilted relative to the central region 5, and so the annular region 3 has a centre of curvature that is not on the optical axis. The tilt of the annular region 3 relative to the central region 5 means that the radial sagittal power 135 is more negative than the radial sagittal power 135 of the central region 5 at the boundary between the central region 5 and the annular region 5. The radial sagittal power 135 increases with increasing radial distance towards the outer edge of the annular region 3. The radial curvature power 137 is greater across the annular region 3 than across the central region 5 because the annular region 3 provides a radial curvature add power.

Figures 7A, 7B, 7C, 7D:
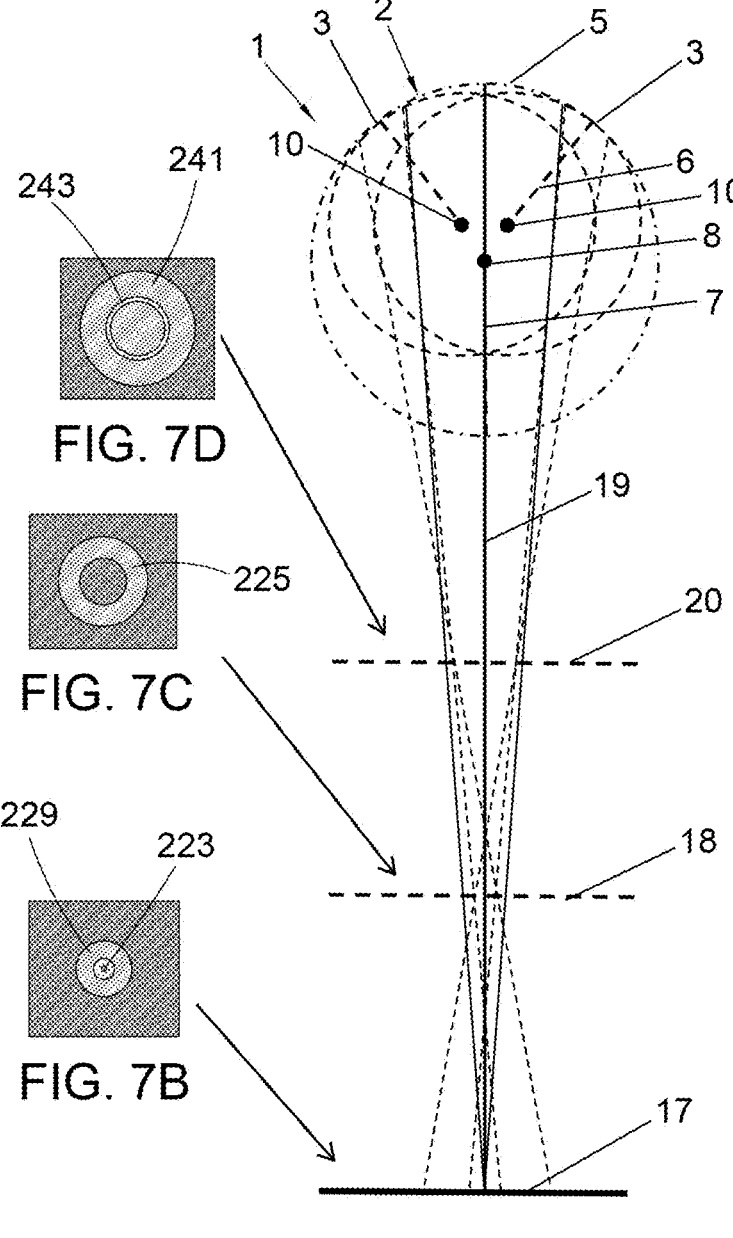
FIG. 7A is a partial ray diagram for a third known lens (a type C lens) for reducing the progression of myopia, with circles indicating the radii of curvature of the central distance region (dashed-dotted line) and the annular add region (dashed line) of the lens.
FIG. 7B shows a light pattern at a distal focal surface of the lens of FIG. 7A formed from a distant point source.
FIG. 7C shows a light pattern at a first proximal focal surface of the lens of FIG. 7A formed from a distant point source.
FIG. 7D shows a light pattern at a second proximal focal surface of the lens of FIG. 7A formed from a distant point source

FIG. 7A shows a partial ray diagram for a third lens (a type C lens) 1 for use in reducing the progression of myopia. The lens 1 is similar to the lens 1 described in FIGS. 1A and 1B, and the lens 1 described in described in FIGS. 5A and 5D. A central region 5 of the lens 1 has a distance corrective radial curvature power, which is equal to the radial sagittal power across the central region. This distance corrective radial curvature power results from a radius of curvature of an anterior surface of the lens 1. The centre of curvature of the central region 5 lies on a first optical axis 19. The annular region 3 has a greater radial curvature power than the base radial curvature power. The annular region 3 radial curvature power is provided by a radius of curvature 6 of the annular region 3, which is smaller than the radius of curvature 7 of the central region 5.

At a point halfway across the width of the annular region 3, the radial curvature power of the annular region 3 has a value of about +3.5 D. Similar to the lens 1 shown in FIGS. 5A and 5D, the annular region 3 of the lens 1 has been radially tilted relative to the central region 5, so that a centre of curvature 10 of the annular region 3 is offset from the first optical axis 19. Tilting the annular region 3 relative to the central region 5 reduces the radial sagittal power at the boundary between the central region 5 and the annular region 3. At a point halfway across the width of the annular region 3, the radial sagittal power is about +2.25 D, so it is greater than the base radial sagittal power but less than the radial curvature power.

As shown in FIG. 7A at a distal focal surface 17, light rays passing through the annular region 3 will generate a blur circle 229 (shown in FIG. 7B) light rays from a distant on-axis point source passing through the central region 5 will form a focused image 223 (shown in FIG. 7B). At a first proximal focal plane 18, light rays passing through the annular region 3 will produce an unfocused annulus 225 (shown in FIG. 7C). At a second proximal focal surface 20, light rays passing through the central region 5 will generate a third blur disc 241 and light rays passing through the annular region 3 will generate a focused annulus 243 lying within the third blur disc 241, as shown in FIG. 7D.

Figure 8A:
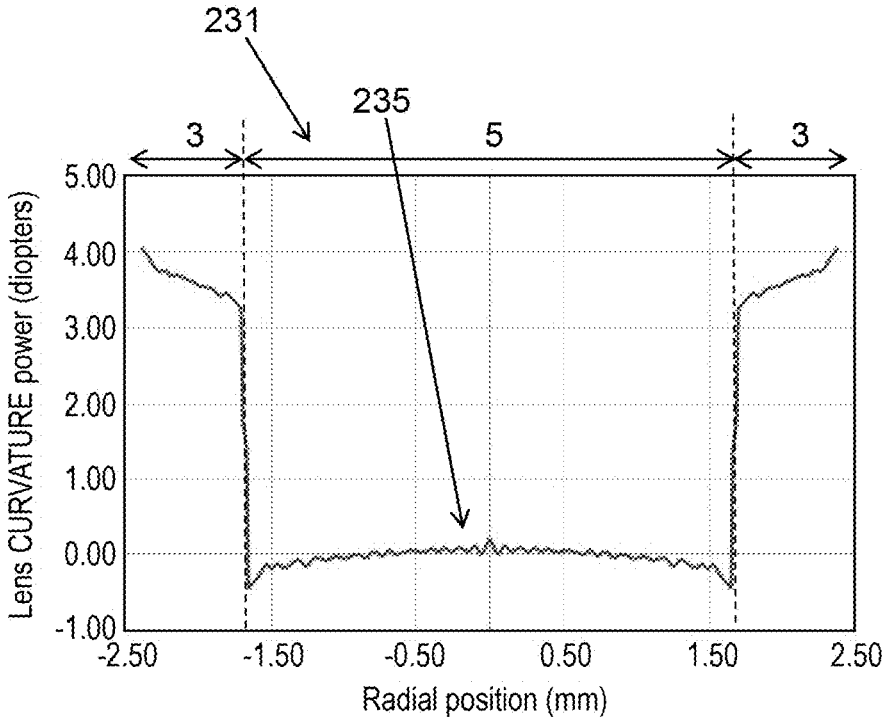
FIG. 8A is a plot showing the variation in radial sagittal power for the lens shown in FIG. 7A.

FIG. 8A is a plot 231 showing the variation in curvature power 235 across a radial diameter of the lens 1 shown in FIG. 7A. This plot 231 shows the average of the radial and circumferential curvature power. Across the central region 5, the curvature power 235 of the lens 1 is approximately constant, and approximately zero. At the boundary between the central region 5 and the annular region 3, the curvature power 235 shows a sharp increase. This is due to an increase in the radial curvature power. The circumferential curvature power will not change significantly at the boundary between the central region 5 and the annular region 3, but the radial curvature power will increase, and thus the average curvature power 235 will increase at the boundary.

Figure 8B:
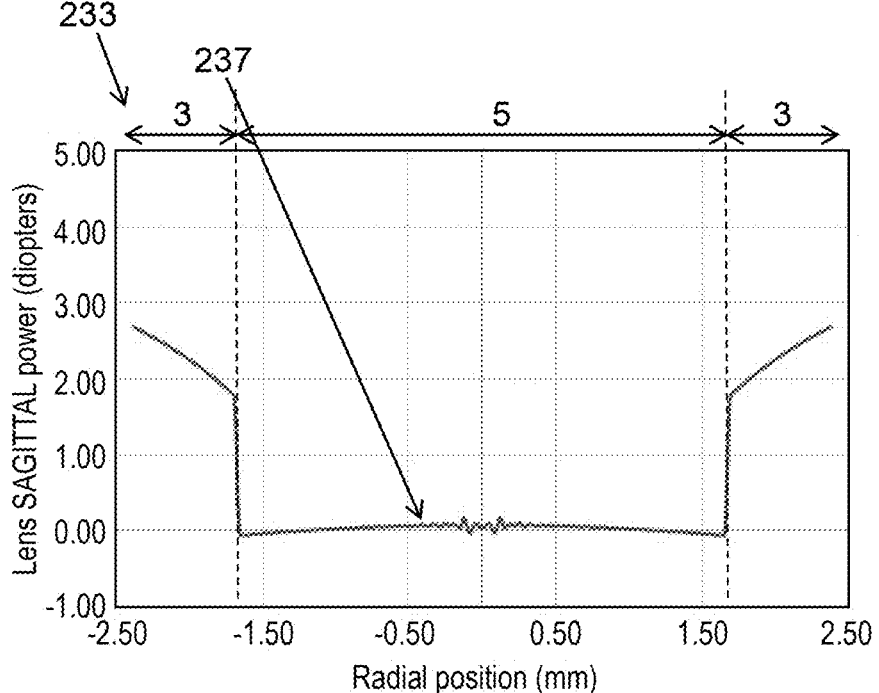
FIG. 8B is a plot showing the variation in radial curvature power for the lens shown in FIG. 7A.

FIG. 8B is a plot 233 showing the variation in sagittal power 237 across a radial diameter of the lens 1 shown in FIG. 7A. This plot 233 shows the average of the radial and circumferential sagittal power. Across the central region 5 of the lens 1, the sagittal power 237 is constant and has a value of 0.0 D. At the boundary between the central region 5 and the annular region 3, the sagittal power 237 of the annular region 3 increases sharply, due to an increase in the radial sagittal power. The radial sagittal power increases, extending radially outwards across the width of the annular region 3, in an approximately linear manner. In contrast to the sagittal power curve shown in FIG. 6A there is no dip in the sagittal power 237 at the boundary between the central region 5 and the annular region 3. The increase in sagittal power 237 at the boundary between the central region 5 and the annular region 3 will not be as large as it would be for a type A lens having an on-axis add-power annular region, (for example, as described in FIGS. 1A-4B).

Figure 9:
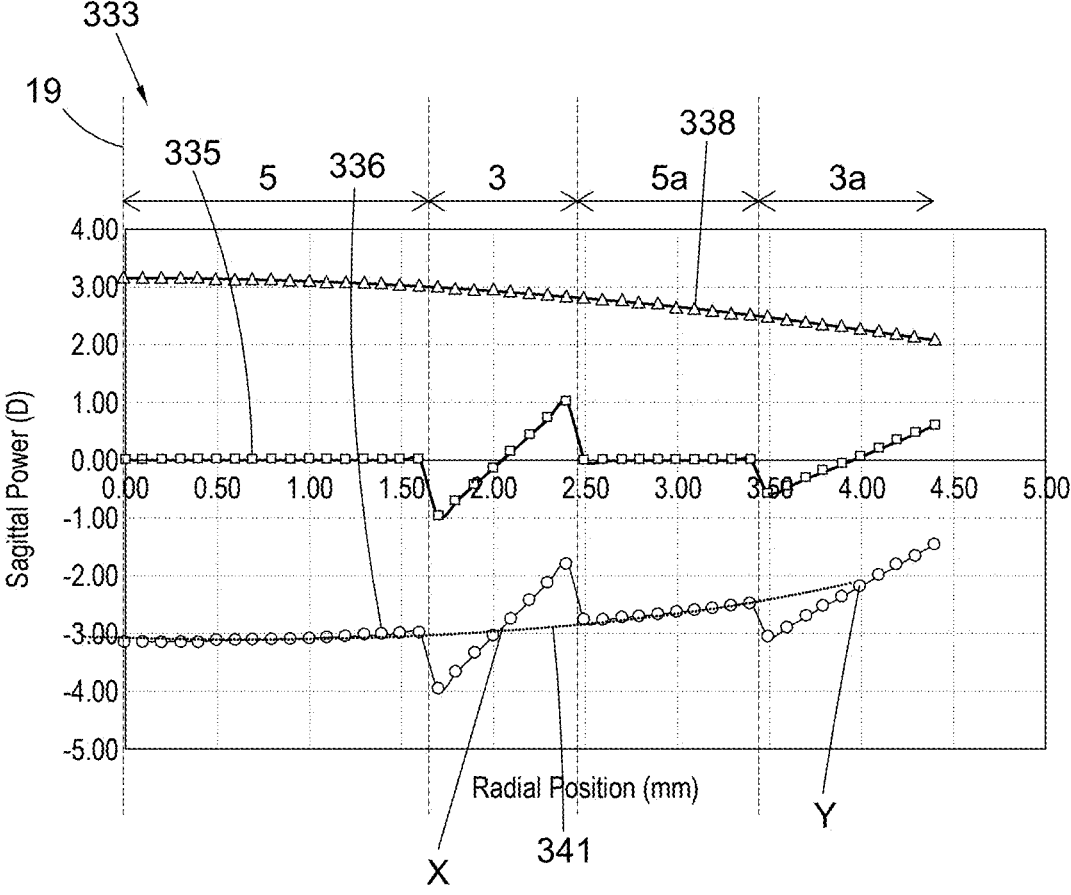
FIG. 9 is a plot showing the variation in radial sagittal power for a first lens according to an embodiment of the present disclosure.

FIG. 9 shows radial sagittal power plot 333 for an ophthalmic lens 1 according to an embodiment of the present disclosure. This lens 1 is based on a type B lens 1, as shown in FIGS. 5A-6B, but this lens 1 includes a correction which compensates for spherical aberration of the lens of an eye. The lens 1 has non-coaxial optics, i.e., the annular region 3 of the lens 1 does not focus light from a distant on-axis point source to a point on the optical axis 19.

The lens 1 comprises a central region 5 that provides the distance corrective radial curvature power, a first annular region 3 that circumscribes the central region 5, a second annular region 5*a* that circumscribes the first annular region 3, and a third annular region 3*a* that circumscribes the first annular region 3. The first annular region 3 and the third annular region 3*a* provide a radial curvature add power and are radially tilted relative to the central region 5. In between the first annular region 3 and the third annular region 3*a*, the second annular region 5*a* provides the distance corrective radial curvature power.

The lens 1 is manufactured using a method according to an embodiment of the present disclosure, as explained below.

The curve 338 with triangular markers shows a spherical aberration power profile 338 for an eye. The spherical aberration power profile 338 shows variation in radial sagittal power for the lens an eye as a function of radial distance from an optical axis of the eye. The radial sagittal power of the eye decreases with increasing radial distance from the optical axis of the eye, following a smooth curve.

The curve 335 with square markers shows a target radial sagittal power profile 335 for a lens wearer. The target radial sagittal power profile shows the desired variation in radial sagittal power for lens wearer as a function of radial distance from an optical axis of the eye. In this example, the target radial sagittal power profile 335 is similar to the radial sagittal power profile 135 for the type B non-coaxial lens 1 described in FIGS. 5A-6B. Across a central region 5 of the lens 1 the target radial sagittal profile 335 is flat and the radial sagittal power matches the distance corrective radial curvature power for the lens 1. At the boundary of the central region 5 and the first annular region 3, there is a sharp decrease in radial sagittal power. Across the radial width of the first annular region 3 there is a linear increase in radial sagittal power, and the radial sagittal power profile 335 has a constant gradient. At a point halfway across the radial width of the first annular region 3 the radial sagittal power matches the radial sagittal power of the central region 5, i.e., the radial sagittal power at a point halfway across the radial width of the first annular region 3 matches the distance corrective radial curvature power. The average radial sagittal add power across the first annular region 3 is zero. At an outer edge of the first annular region 3, there is another sharp decrease in radial sagittal power. Across the second annular region 5*a* the radial sagittal power is constant, and is equal to the distance corrective radial curvature power. At the boundary between the annular distance power region 5*a* and the second annular region 3*a*, there is a sharp decrease in radial sagittal power. Across the second annular region 3*a*, there is an increase in radial sagittal power and the radial sagittal power profile has a constant gradient.

The curve 336 with circular markers shows a compensated radial sagittal power profile 336 that results from subtracting the spherical aberration power profile 338 for an eye from the target radial sagittal power profile 335 for a lens wearer. In methods according to embodiments of the present disclosure, the compensated radial sagittal power profile 336 is used to manufacture the ophthalmic lens 1. Across the central region 5 the radial sagittal power increases with increasing radial distance from the optical axis 19 of the lens 1. The gradient of the radial sagittal power profile 336 increases with increasing distance from the optical axis following a first curve. The first curve 341 has an opposite shape to the spherical aberration power profile 338, and is indicated by the dotted line 341 in FIG. 9. At the boundary between the central region 5 and the first annular region 3, there is a sharp decrease in radial sagittal power. Across the radial width of the first annular region 3, the radial sagittal power increases with increasing radial distance from the optical axis 19 and the gradient of the radial sagittal power profile 336 increases with increasing radial distance from the optical axis 19. The increase in radial sagittal power across the first annular region 3 is greater than the increase in radial sagittal power across the central region 5 as a result of the radial tilt of the first annular region 3. At a point halfway across the radial width of the first annular region 3 (labelled 'X' in FIG. 9), the radial sagittal power lies on the first curve 341. At the boundary between the first annular region 3 and the second annular region 5*a*, there is a sharp decrease in radial sagittal power. Across the second annular region 5*a* the radial sagittal power increases with increasing radial distance from the optical axis 19 of the lens 1, and the gradient of the radial sagittal power profile 336 increases with increasing distance from the optical axis 19 following the first curve. At the boundary between the second annular region 5*a* and the third annular region 3*a* there is another sharp decrease in radial sagittal power. Across the radial width of the third annular region 3*a* the radial sagittal power increases with increasing radial distance from the optical axis 19 and the gradient of the radial sagittal power profile 336 increases with increasing radial distance from the optical axis 19. At a point halfway across the radial width of the third annular region 3*a* (labelled 'Y' in FIG. 9), the radial sagittal power lies on the first curve. The increase in radial sagittal power across the third annular region 3*a* is greater than the increase in radial sagittal power across the central region 5 and the annular distance region 5*a*, because the second annular region 3*a* is radially tilted relative to the central region 5 and the annular distance region 5*a*. The increase in radial sagittal power across the third annular region 3*a* is greater than the increase in radial sagittal power across the first annular region 3, and the rate of increase of the radial sagittal power across the third annular region 3*a* is greater than the rate of increase in radial sagittal power across the first annular region 3, because spherical aberration of the eye of the lens increases with increasing distance from the optical axis 19. Similarly, the increase in radial sagittal power across the second annular region 5*a* is greater than the increase in radial sagittal power across the central region 5, and the rate of increase of the radial sagittal power across the second annular region 5*a* is greater than the rate of increase in radial sagittal power across the central region 5, because spherical aberration of the eye of the lens wearer increases with increasing distance from the optical axis 19.

Figure 10:
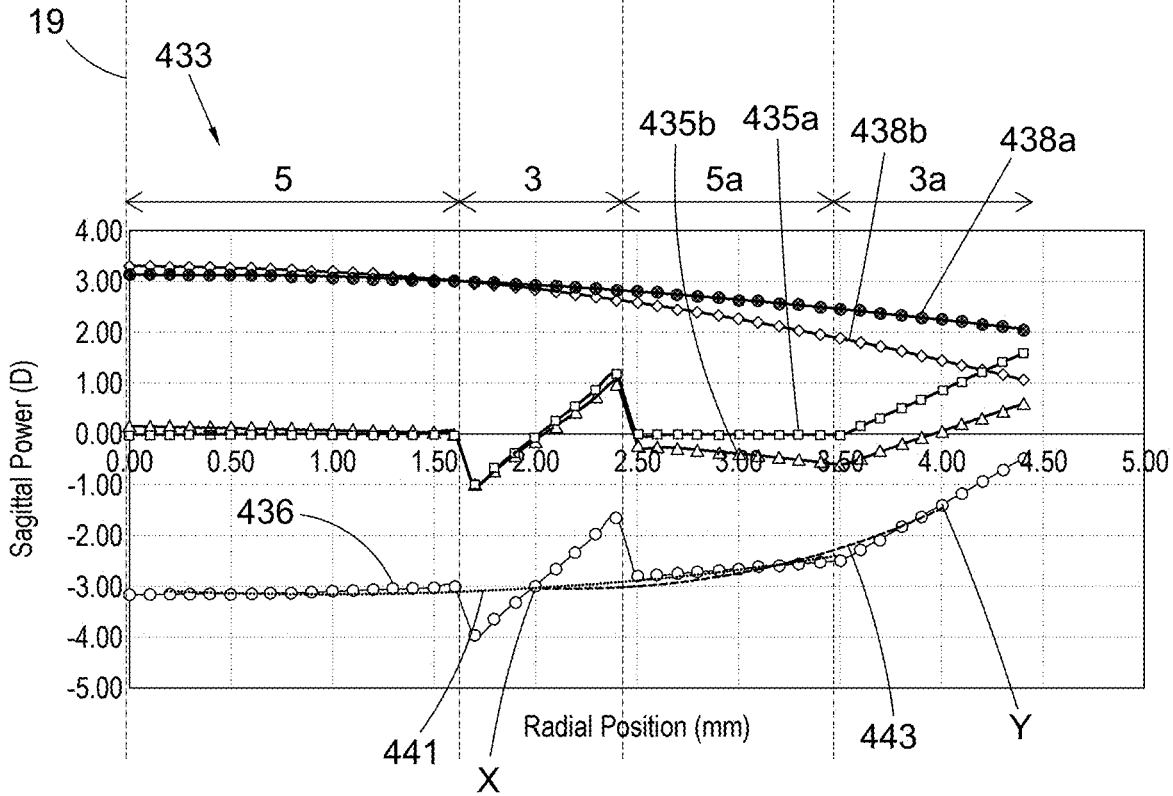
FIG. 10 is a plot showing the variation in radial sagittal power for a second lens according to an embodiment of the present disclosure.

FIG. 10 shows radial sagittal power plot 433 for another ophthalmic lens 1 according to an embodiment of the present disclosure. This lens 1 is similar to the lens 1 described in FIG. 9, but the distance corrective power regions of the lens 1 (i.e., the central region 5 and the second annular region 5*a*) are corrected by a first spherical aberration power profile 438*a* that has been measured for an eye in a non-accommodating state (i.e., an eye viewing distant objects), and the treatment regions of the lens 1 (i.e., the first annular region 3 and the third annular region 3*a*) are corrected by a second spherical aberration power profile 438*b* that has been measured for an eye in an accommodating state (i.e., an eye viewing near objects) lens wearer viewing near objects. The lens 1 comprises a central region 5, a first annular region 3, a second annular region 5*a*, and a third annular region 3*a*. The first annular region 3 and the third annular region 3*a* provide a radial curvature add power, and are radially tilted relative to the central region 5 of the lens 1. In between the first annular region 3 and the second annular region 3a there is a second annular region 5a that provides the distance corrective radial curvature power. The lens 1 has non coaxial optics (i.e., the first annular region 3 and the second annular region 3a focus light from a distant on-axis point source to a point that is not on the optical axis 19 of the lens), similar to type B lens 1 described in FIGS. 5A to 6B, and the lens 1 of FIG. 9.

The curve 438a with solid circular markers shows a first spherical aberration power profile 438a for an eye in a non-accommodating state (i.e., for an eye viewing distant objects). The radial sagittal power of the eye decreases with increasing radial distance from the optical axis of the eye, following a smooth curve. The curve 438b with diamond markers shows a second spherical aberration power profile 438b for an eye in an accommodating state (i.e., for an eye viewing near objects), and plots variation in radial sagittal power for the eye as a function of radial distance from an optical axis of the eye. Spherical aberration of the eye is greater when viewing near objects than when viewing distant objects, and as a result, the impact of spherical aberration on radial sagittal power of the eye is greater when the eye is viewing near objects. The spherical aberration power profile for near objects 438b therefore decreases more, and at a faster rate, with increasing radial distance from the optical axis 19 than the spherical aberration power profile 438a for an eye in a non-accommodating state.

The curve 436 with circular markers shows a compensated radial sagittal power profile that has been corrected using the spherical aberration power profiles 438a and 438b. The central region 5 of the lens 1 and the annular distance region 5a of the lens 1 have been corrected by subtracting the spherical aberration curve 438a from a target radial sagittal power profile 435a, shown by the curve 435a with square markers, which is optimised for distance vision. The first annular region 3 and second annular region 3a of the lens 1 have been corrected by subtracting the spherical aberration curve 438a from a target radial sagittal power profile 435b, shown by the curve 435b with triangular markers, which is optimised for near vision.

Across the central region 5, the radial sagittal power increases with increasing radial distance from the optical axis 19 of the lens 1. The gradient of the radial sagittal power profile 436 increases with increasing distance from the optical axis following a first curve 441. The first curve mirrors the first spherical aberration power profile 438a. At the boundary between the central region 5 and the first annular region 3, there is a sharp decrease in radial sagittal power. Across the radial width of the first annular region 3, the radial sagittal power increases with increasing radial distance from the optical axis 19 and the gradient of the radial sagittal power profile 436 increases with increasing radial distance from the optical axis 19. The increase in radial sagittal power across the first annular region 3 is greater than the increase in radial sagittal power across the central region 5 as a result of the radial tilt of the first annular region 3. At the boundary between the first annular region 3 and the second annular region 5a, there is a sharp decrease in radial sagittal power. Across annular distance region 5a the radial sagittal power increases with increasing radial distance from the optical axis 19 of the lens 1, and the gradient of the radial sagittal power profile 436 increases with increasing distance from the optical axis 19 following the first curve, because both the central region 5 and the annular distance region 5a are corrected using the spherical aberration power profile 438a for an eye in a non-accommodating state. At the boundary between the second annular region 5a and the third annular region 3a, there is not a sharp decrease in radial sagittal power, but there is a sharp increase in gradient of the radial sagittal power profile. Both the first annular region 3 and the second annular region 3a have been corrected using the second spherical aberration power profile 438b, for an eye in an accommodating state. As spherical aberration is greater for an eye in an accommodating state, the correction across the first annular region 3 and the third annular region 3a is greater than the correction across the central region 5 and the first annular distance region 5a. As a result, the radial sagittal power profile across the third annular region 3a is shifted upwards and will show a greater increase with increasing radial distance from the optical axis, compared to the radial sagittal power profile for the second annular region 3a shown in FIG. 9. Across the radial width of the second annular region 3a, the radial sagittal power increases with increasing radial distance from the optical axis 19 and the gradient of the radial sagittal power profile 436 increases with increasing radial distance from the optical axis 19. At a point halfway across the radial width of the first annular region 3 (labelled 'X' in FIG. 10), and at point halfway across the radial width of the second annular region 3a (labelled 'Y' in FIG. 10) the radial sagittal power lies on a second curve 443 that mirrors the second spherical aberration power profile 438b, because the first annular region 3 and the second annular region 3a are corrected for spherical aberration when the eye is in an accommodating state.

In the example embodiments of the present disclosure described in FIGS. 9 and 10 above, the manufactured lens is a non coaxial lens that is similar to the known type B lens described in FIGS. 5A-6B, with an additional spherical aberration correction. It will be appreciated that the spherical aberration correction described in FIG. 9, or the spherical aberration correction described in FIG. 10 could similarly be applied to lenses similar to type A lenses, as described in FIGS. 1A-4B, or to type C lenses described in FIGS. 7A-8B, and that these lenses may include any of the regions described in paragraphs [0127]-[0137].

In the example embodiments of the present disclosure described in FIGS. 9 and 10 above, the manufactured lens compensates for spherical aberration profile of a lens of an eye that results the radial sagittal power profile of the lens of the eye decreasing with increasing radial distance from the optical axis, with a gradient that increases with increasing radial distance from the optical axis.

Figure 11:
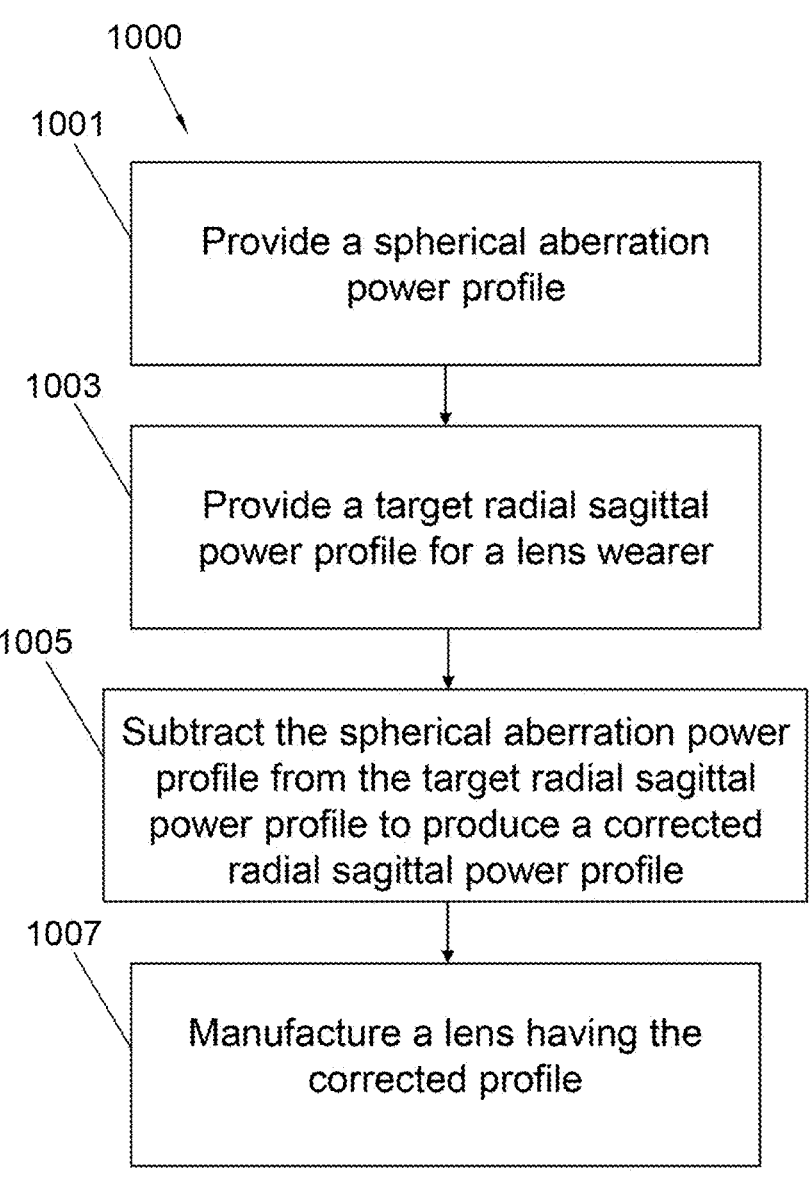
FIG. 11 is a flowchart showing a method of manufacturing an ophthalmic lens according to an embodiment of the present disclosure.

FIG. 11 is a flowchart showing a method 1000 of manufacturing an ophthalmic lens, according to an embodiment of the present disclosure. In a first step 1001, a spherical aberration power profile for an eye is provided, the spherical aberration power profile being the variation in radial sagittal power for an eye as a function of radial distance from an optical axis of the eye. In a second step, 1003, a target radial sagittal power profile is provided for the eye of a lens wearer, the target radial sagittal power profile being the target variation in radial sagittal power as a function of radial distance from an optical axis of the eye of the lens wearer. The target radial sagittal power profile will have a central region having a base radial curvature power, and a first annular region that provides a radial curvature add power. In a third step 1005, the spherical aberration power profile is subtracted from the target radial sagittal power profile, thereby providing a compensated radial sagittal power profile for an ophthalmic lens. In a fourth step, 1007, an ophthalmic lens having the compensated radial sagittal power profile is manufactured.

It will be appreciated by those of ordinary skill in the art that features of these example embodiments may be combined in other embodiments that fall within the scope of the present disclosure.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. An ophthalmic lens, the lens including an optic zone comprising:
   a central region having a curvature that is centred on an optical axis, the central region providing a distance corrective radial curvature power, curvature power being determined by a local curvature of the lens, and having a radial slope power profile that increases with increasing radial distance from the optical axis, slope power at a location being determined by a slope of a wavefront after the wavefront has passed through the lens divided by the radial distance of the location from the optical axis, wherein the gradient of the radial slope power profile across the central region increases with increasing radial distance from the optical axis, following a first curve; and
   a first annular region circumscribing the central region, the first annular region providing a radial curvature add power having a greater radial curvature add power than the central region,
   wherein the first annular region has a radial slope power profile that increases with increasing radial distance from the optical axis, wherein the gradient of the radial slope power profile across the first annular region increases with increasing radial distance from the optical axis, following a second curve, and
   wherein the radial slope power increases across the radial width of the first annular region from a first value that lies below the first curve, to a second value that is greater than the first curve.

2. The ophthalmic lens according to claim 1, further comprising a second annular region circumscribing the first annular region, wherein the second annular region provides a distance corrective radial curvature power and has a radial slope power profile that increases with increasing radial distance from the optical axis, wherein the gradient of the radial slope power profile across the second annular region increases with increasing radial distance from the optical axis, following the first curve.

3. The ophthalmic lens according to claim 2, further comprising a third annular region circumscribing the second annular region, wherein the third annular region provides a radial curvature add power.

4. The ophthalmic lens according to claim 3, wherein the third annular region has a radial slope power profile that increases with increasing radial distance from the optical axis, wherein the gradient of the radial slope power profile across the first annular region increases with increasing radial distance from the optical axis following a third curve.

5. The ophthalmic lens according to claim 1, wherein there is a sharp decrease in radial slope power at a boundary between the central region and the first annular region.

6. The ophthalmic lens according to claim 1, wherein at a point halfway across the radial width of the first annular region, the radial slope power lies on the first curve.

7. The ophthalmic lens according to claim 1, wherein the central region provides an average distance corrective radial curvature power of between +0.5 D and −15.0 D.

8. The ophthalmic lens according to claim 1, wherein the first annular region provides a radial curvature add power that is at least +10.0 D more positive than the average distance corrective radial curvature power.

9. The ophthalmic lens according to claim 1, wherein the central region has a diameter of between about 2.0 and 4.0 mm.

10. The ophthalmic lens according to claim 1, wherein the lens is a contact lens.

11. A contact lens according to claim 10, wherein the lens comprises a hydrogel material, or a silicone hydrogel material, or a combination thereof.

12. A method of manufacturing an ophthalmic lens, the method comprising:
   providing a spherical aberration power profile, the spherical aberration power profile being the variation in radial slope power for an eye, as a function of radial distance from an optical axis of the eye, slope power at a location being determined by a slope of a wavefront after the wavefront has passed through an optical surface divided by the radial distance of the location from the optical axis;
   providing a target radial slope power profile for a lens wearer, the target radial slope power profile being the target variation in radial slope power as a function of radial distance from an optical axis of the eye of the lens wearer, wherein the target radial slope power profile includes a central region having a distance corrective radial curvature power, curvature power being determined by a local curvature of an optical surface, and a first annular region that provides a radial curvature add power having a greater radial curvature add power than the central region;
   subtracting the spherical aberration power profile from at least the central region of the target radial slope power profile, thereby providing a corrected radial slope power profile for an ophthalmic lens, wherein the central region has a radial slope power profile that increases with increasing radial distance from the optical axis, wherein the gradient of the radial slope power profile across the central region increases with increasing radial distance from the optical axis, following a first curve; wherein the first annular region has a radial slope power profile that increases with increasing radial distance from the optical axis, wherein the gradient of the radial slope power profile across the first annular region increases with increasing radial distance from the optical axis, following a second curve, and wherein the radial slope power increases across the radial width of the first annular region from a first value that lies below the first curve, to a second value that is greater than the first curve; and
   manufacturing an ophthalmic lens having the corrected radial slope power profile.

13. The method according to claim 12, comprising:
   providing a first spherical aberration power profile that plots variation in radial slope power for a lens wearer's eye when the eye is in a first non-accommodating state;

providing a second spherical aberration power profile that plots variation in radial slope power for a lens wearer's eye when the eye is in a second, accommodating state;

subtracting the first spherical aberration power profile from the central region of the target radial slope power profile; and subtracting the second spherical aberration power profile from the first annular zone of the target radial slope power profile.

* * * * *